United States Patent
Takano

(10) Patent No.: US 12,091,220 B2
(45) Date of Patent: Sep. 17, 2024

(54) LID

(71) Applicant: KY7 INC., Tokyo (JP)

(72) Inventor: Akira Takano, Machida (JP)

(73) Assignee: KY7 INC., Tokyo (JP)

( * ) Notice: Subject to any disclaimer, the term of this patent is extended or adjusted under 35 U.S.C. 154(b) by 0 days.

(21) Appl. No.: 17/768,037

(22) PCT Filed: Jun. 3, 2021

(86) PCT No.: PCT/JP2021/021201
§ 371 (c)(1),
(2) Date: Apr. 11, 2022

(87) PCT Pub. No.: WO2021/246488
PCT Pub. Date: Dec. 9, 2021

(65) Prior Publication Data
US 2024/0092541 A1    Mar. 21, 2024

(30) Foreign Application Priority Data

Jun. 4, 2020   (JP) .................. 2020-097339
Aug. 20, 2020  (JP) .................. 2020-139288
(Continued)

(51) Int. Cl.
*B65D 43/06*   (2006.01)
*B65D 43/02*   (2006.01)

(52) U.S. Cl.
CPC ......... *B65D 43/06* (2013.01); *B65D 43/0202* (2013.01); *B65D 2543/00027* (2013.01);
(Continued)

(58) Field of Classification Search
CPC ................ B65D 43/06; B65D 43/0204; B65D 2543/00268
See application file for complete search history.

(56) References Cited

U.S. PATENT DOCUMENTS 1,700,164 A * 1/1929 Hulbert .............. B65D 43/0233
                                                    229/5.7
2,438,430 A   3/1948 Di Cosmo et al.
(Continued)

FOREIGN PATENT DOCUMENTS

CN   207666393 U   7/2018
CN   112707030 A   4/2021
(Continued)

OTHER PUBLICATIONS

Jan. 13, 2023 Search Report Issued in Indian Patent Application No. 202247074233.
(Continued)

*Primary Examiner* — Jeffrey R Allen
(74) *Attorney, Agent, or Firm* — Oliff PLC

(57) ABSTRACT

A lid having an excellent sealability of an opening part of a container is for attaching to an opening part of a container in a removable manner, characterized in including a cover wall and a side wall which surrounds the circumference of the cover wall, which is tapered from an upper end towards an lower end and which is made of a paper material, wherein the cover wall and the side wall are integrated with each other by a standing part formed on the circumference of the cover wall being joined to an inner surface of an upper wall of the side wall, wherein an engaging part for engaging with the opening part of the container is provided on an inner circumferential side of a lower wall of the side wall.

19 Claims, 26 Drawing Sheets

(30) Foreign Application Priority Data

| | | |
|---|---|---|
| Sep. 23, 2020 | (JP) | 2020-159188 |
| Dec. 23, 2020 | (WO) | PCT/JP2020/048100 |
| Mar. 14, 2021 | (JP) | 2021-040879 |
| Apr. 27, 2021 | (JP) | 2021-074669 |
| Jun. 2, 2021 | (JP) | 2021-093197 |

(52) U.S. Cl.
CPC ............. *B65D 2543/00092* (2013.01); *B65D 2543/00268* (2013.01); *B65D 2543/00537* (2013.01)

(56) References Cited

U.S. PATENT DOCUMENTS

| | | | |
|---|---|---|---|
| 4,709,824 A | | 12/1987 | Thompson |
| 5,960,986 A | * | 10/1999 | Nielsen ............. B65D 43/0222 229/5.5 |
| 2008/0009481 A1 | | 1/2008 | Thakashinamoorthy et al. |
| 2011/0233208 A1 | | 9/2011 | Kim |
| 2014/0054306 A1 | | 2/2014 | Panek et al. |
| 2016/0083151 A1 | * | 3/2016 | Stahlecker ......... B65D 43/0222 493/379 |
| 2021/0316912 A1 | | 10/2021 | Yamada |
| 2022/0258932 A1 | * | 8/2022 | Yamada ................. B65D 43/14 |

FOREIGN PATENT DOCUMENTS

| | | |
|---|---|---|
| CN | 114423686 A | 4/2022 |
| CN | 216425426 U | 5/2022 |
| EP | 4005940 A1 | 6/2022 |
| EP | 4008643 A1 | 6/2022 |
| JP | S53-137785 A | 12/1978 |
| JP | H04-071610 U | 6/1992 |
| JP | 2602516 B2 | 4/1997 |
| JP | 2001-238932 A | 9/2001 |
| JP | 2002-274505 A | 9/2002 |
| JP | 2006-248530 A | 9/2006 |
| JP | 2007-537940 A | 12/2007 |
| JP | 2012-513940 A | 6/2012 |
| JP | 2016-069086 A | 5/2016 |
| JP | 6886068 B1 | 6/2021 |
| TW | 201412610 A | 4/2014 |
| WO | 2020/100316 A1 | 5/2020 |

OTHER PUBLICATIONS

Mar. 23, 2021 International Search Report issued in International Patent Application No. PCT/JP2020/048100.
Mar. 23, 2021 Written Opinion issued in International Patent Application No. PCT/JP2020/048100.
Aug. 24, 2021 International Search Report issued in International Patent Application No. PCT/JP2021/021201.
Aug. 24, 2021 Written Opinion issued in International Patent Application No. PCT/JP2021/021201.
Jan. 7, 2021 Office Action issued in Japanese Patent Application No. 2020-213032.
Jan. 29, 2021 Office Action issued in Japanese Patent Application No. 2020-213032.
Apr. 9, 2021 Office Action issued in Japanese Patent Application No. 2020-213032.
Nov. 26, 2021 Office Action issued in Japanese Patent Application No. 2021-093197.
Nov. 12, 2021 Office Action issued in Chinese Patent Application No. 202121243752.2.
Jan. 20, 2022 Office Action issued in Taiwanese Patent Application No. 110120494.
Japanese Patent Application No. 2021-114709 filed on Jul. 12, 2021.
Japanese Patent Application No. 2022-062192 filed on Apr. 3, 2022.
1 Nov. 9, 2022 Office Action issued in Chinese Patent Application No. 202110624194.2.
Jun. 29, 2022 Office Action issued in Chinese Patent Application No. 202110624194.2.
Jul. 5, 2022 Notice of Allowance issued in Japanese Patent Application No. 2021-093197.

\* cited by examiner

A

B

A

B

LID

TECHNICAL FIELD

The present invention relates to a lid comprising a paper material.

BACKGROUND ART

In convenience stores and supermarkets etc., it is common that beverage and food are sold in simple containers. For example in convenience stores, beverages such as coffee are sold in cup-shaped containers made of paper and plastics. Various lids for covering the opening part of the container have been proposed for preventing the content from spilling out when the customer takes away the beverage such as coffee. As these types of lids, plastic articles have widely been used. However, since plastic articles may cause various environmental issues, efforts have recently been made to reduce the use of plastics as the raw material for lids and simple containers for beverage and food that are disposed after a short period of time. Accordingly, lids made of paper instead of plastics have been proposed (patent document 1, patent document 2).

CITATION LIST

Patent document 1: JP2006-248530
Patent document 2: JP2012-513940

SUMMARY OF INVENTION

Technical Problem

However, paper materials have low elasticity of the material compared to plastic materials and have a low formability, thus it is difficult to form them into complex shapes like plastics. Accordingly, unlike lids made of plastics, it was not easy to obtain a paper lid having a shape and a structure which allows closing of the opening part of a container with a high sealability with certainty so that the leakage of the content of the container is prevented even when the content is liquid.

Various structural improvements have been made in order to increase the adhesion of a paper lid to the opening part of a container. Patent document 1 discloses a lid comprising a wall part having a conical outer surface for engaging with the inner side of the conical main body of a paper container and a cover wall surrounded by said wall part, configured to fit inside the opening part of the container. Patent document 2 discloses a paper lid made of a top board and a side wall provided downwardly around the top board, configured to close a container by the part around the upper edge of the container being held by the storage part between the inner upper end of the reinforcing member for reinforcing the side wall and the top board.

However, the paper lids described in patent documents 1 and 2 do not have sufficient adhesion with the opening part of the container when the lid is closed and has a risk of the leakage of the liquid in the container. Also, with lids and containers made of paper, due to the characteristics of paper, variations are likely to occur in the dimensions of the lid and the opening part of the container by the influence of the moisture etc. However, with the above known paper lids, the part which engages with the opening part of the container has a structure in which the side wall and the cover wall overlap or the side wall is reinforced with a reinforcing material, and thus the part which fits the opening part of the container is hard and is not very elastic. Accordingly, there was a problem that small variations in the dimensions of the lid and the opening part of the container would cause the container to be not closable with certainty and a stable sealability is not obtained.

The present invention was made in view of the above and its objective is to provide a lid which comprises a paper material and which has a stable sealability also for a paper container and which has an excellent liquid leakage prevention.

Means of Solving the Problems

Accordingly, the invention is summarized as:
(1) A lid for attaching to an opening part of a container in a removable manner, comprising a cover wall and a side wall which surrounds the circumference of the cover wall, which is tapered from an upper end towards an lower end and which is made of a paper material, wherein the cover wall and the side wall are integrated with each other by a standing part formed on the circumference of the cover wall being joined to an inner surface of an upper wall of the side wall, wherein an engaging part for engaging with the opening part of the container is provided on an inner circumferential side of a lower wall of the side wall.
(2) The lid according to (1), wherein the side wall is a tube made by joining edges of the paper material.
(3) The lid according to (1), wherein the engaging part of the lower wall of the side wall has a shape which engages with a curled portion the opening part of the container.
(4) The lid according to (1), wherein the engaging part of the lower wall of the side wall comprises a ring-shaped recess made by pressing the inner circumference surface of the lower wall.
(5) The lid according to (1), wherein the engaging part has an inner diameter that is smaller at a lower end thereof than at an upper end thereof.
(6) The lid according to (1), wherein when it is attached to the opening part of the container, it is attached so that a lower end of the engaging part is in a non-contact state with a side wall of the container.
(7) The lid according to (1), wherein the side wall is tapered at a smaller tilt angle than a tilt angle of a side wall of the container to which the lid is to be attached.
(8) The lid according to (1), wherein the cover wall is made of a paper material.
(9) The lid according to (1), wherein the cover wall is made of a film or a sheet.
(10) The lid according to (1), wherein the cover wall comprises a recessed part recessed in the direction from the standing part towards the inner side.
(11) The lid according to (1), wherein an upper end part of the upper wall of the side wall is folded towards the inner surface of the standing part at the circumference of the cover wall.
(12) The lid according to (1), wherein an upper end of the standing part of the cover wall is folded towards the inner surface of the standing part.
(13) The lid according to (1), wherein an upper end of the standing part of the cover wall is folded towards the outer side of the upper wall of the side wall.
(14) The lid according to (1), provided with a curled part at an upper end thereof.

(15) The lid according to (14), wherein the curled part is formed by bending an upper end part of the upper wall of the side wall.

(16) The lid according to (14), wherein the curled part is formed by bending an upper end part of the standing part of the cover wall.

(17) The lid according to any one of (1) to (16), wherein the side wall is made by joining edges of an annular sector shaped blank material such that it is tapered from the upper end towards the lower end.

(18) The lid according to any one of (1) to (17), wherein the cover wall comprises a top surface and the top surface is curved to be recessed.

A preferred embodiment of the present invention relates to a lid for attaching to an opening part of a container in a removable manner, comprising a cover wall and a side wall which surrounds the circumference of the cover wall, which is tapered from an upper end towards an lower end and which is made of a paper material, wherein the cover wall and the side wall are integrated with each other by a standing part formed on the circumference of the cover wall being joined to an inner surface of an upper wall of the side wall, wherein an engaging part for engaging with the opening part of the container in a state where the opening part of the opening is closed is provided on an inner circumferential side of a lower wall of the side wall which is tapered from the upper end towards the lower end, wherein the engaging part has an inner diameter that is smaller at a lower end thereof than at an upper end thereof.

A preferred embodiment of the present invention relates to a lid for attaching to an opening part of a container in a removable manner, comprising a cover wall and a side wall which surrounds the circumference of the cover wall, which is tapered from an upper end towards an lower end and which is made of a paper material, wherein the side wall is made by joining edges of an annular sector shaped blank material such that it is tapered from the upper end towards the lower end, wherein the cover wall and the side wall are integrated with each other by a standing part formed on the circumference of the cover wall being joined to an inner surface of an upper wall of the side wall, wherein an engaging part for engaging with the opening part of the container in a state where the opening part of the opening is closed is provided on an inner circumferential side of a lower wall of the side wall which is tapered from the upper end towards the lower end, wherein the engaging part has an inner diameter that is smaller at a lower end thereof than at an upper end thereof.

Herein the term "blank material" may mean a board material having a product outer shape suitable for being subjected to press working and shaping such as bending and drawing.

In other words, the present invention relates to a lid attachable to an opening part of a container in a removable manner, wherein the lid comprises a cover wall and a side wall including an upper wall and a lower wall, wherein the upper wall is tapered in a direction from an upper end of the side wall towards a lower end of the side wall, wherein the side wall is made of a paper material, wherein the lid further comprises a standing part extending upwardly from the circumference of the cover wall, wherein the cover wall and the standing part are surrounded by the upper wall, wherein an inner surface of the upper wall is joined with the standing part so that the cover wall and the side wall are integrated with each other, and wherein the lower wall comprises an engaging part configured to engage with the opening part of the container, wherein the engaging part is provided on an inner circumferential surface of the lower wall.

Preferably, the engaging part has an inner diameter that is smaller at a lower end thereof than at an upper end thereof and preferably, the lower wall is tapered in the direction from an upper end of the side wall towards a lower end of the side wall, and the engaging part is configured to engage with the opening part of the container when the lid is brought in attachment to the opening part of the container and is thereby made to close the opening part of the container.

Preferably, the side wall is made by joining edges of an annular sector shaped blank material.

The invention further relates to a kit of parts comprising the lid according to the invention and a container having an opening part to which the lid is attachable in a removable manner. Preferably, the side wall of the lid is tapered at a smaller angle than a side wall of the container.

The invention further relates an assembly of the lid according to the invention and a container having an opening part to which the lid is attached in a removable manner. Preferably, a lower end of the engaging part of the lid is in a non-contact state with a side wall of the container.

Effect of the Invention

The lid of the present invention has a structure in which the upper end side of the enclosing side wall (the side wall formed such that it encloses the cover wall) made of a paper material is joined with the standing part formed on the circumference of the cover wall so that they are integrated with each other and in which an engaging part for engaging with the opening part of the container is provided on an inner circumference of the lower end side of the side wall. Because of this, the lower end part provided with the engaging part for engaging with the opening part of the container does not have an overlapping structure of paper materials and thus is elastic. Because of this, even when there are some dimensional errors due to dimensional variations in the outer dimensions of the opening part of the container, the lid part according to the invention can engage with the opening part of the container while maintaining a high sealability and close it. Since the side wall is tapered from the upper end to the lower end, in combination with the fact that the lower end part of the side wall is elastic, the lid does not have the risk of easily coming off from the container even when a load is applied to the lid. Since the lower end part of the side wall is elastic, even when the dimensions of the engaging part are slightly smaller than the outer dimensions of the opening part of the container, it easily engages with the opening part of the container and can exhibit a higher sealability. Since the lid according to the invention has a good adaptability to the variations in the outer dimensions of the opening part of the container, it can be used for containers for different applications wherein the dimensions of the opening parts of the containers are approximately the same. Since the side wall is tapered, the stackability of the lid is increased, allowing reduction of space during storage and transportation of the lid. Since the lower wall of the side wall tapered from the upper end towards the lower end is elastic and the upper wall of the side wall is joined with the standing part provided around the cover wall and provides a high strength structure, the holdability of the lid to the opening part of the container is increased. In the lid of the present invention, the engaging part provided at the elastic lower wall engages with the opening part of the container and ensures strongly holding the opening part of the container to close the opening part of the container. Accordingly, when the pressure inside the container becomes high such as when e.g. hot coffee is inside, or when the container with content accommodated therein accidentally falls, there is no risk that the lid comes off easily, and thus it is more effective as a lid for large containers. Since the lower wall of the side wall provided with the engaging part for engaging with the opening part of the container is elastic, it can engage with the opening part of the container with certainty and the removal of the lid can be performed easily. The lid according to the invention has a structure in which a standing part is provided around the cover wall and the standing part is joined with the inner surface of the upper wall of the side wall. Accordingly, there is no gap at the joined rim between the cover wall part and the side wall like in known lid bodies, so there is no risk that liquid beverages etc. permeate into such gaps. The lid according to the invention is less likely to undergo twist deformation compared to a lid which is wholly made of a plastic molded article, so when transporting a food container closed with the lid, there is a less risk of the lid unexpectedly undergoing twist deformation and coming off.

DESCRIPTION OF EMBODIMENTS

Hereinbelow, the lid of the present invention is elucidated based on figures.

Figure 1:
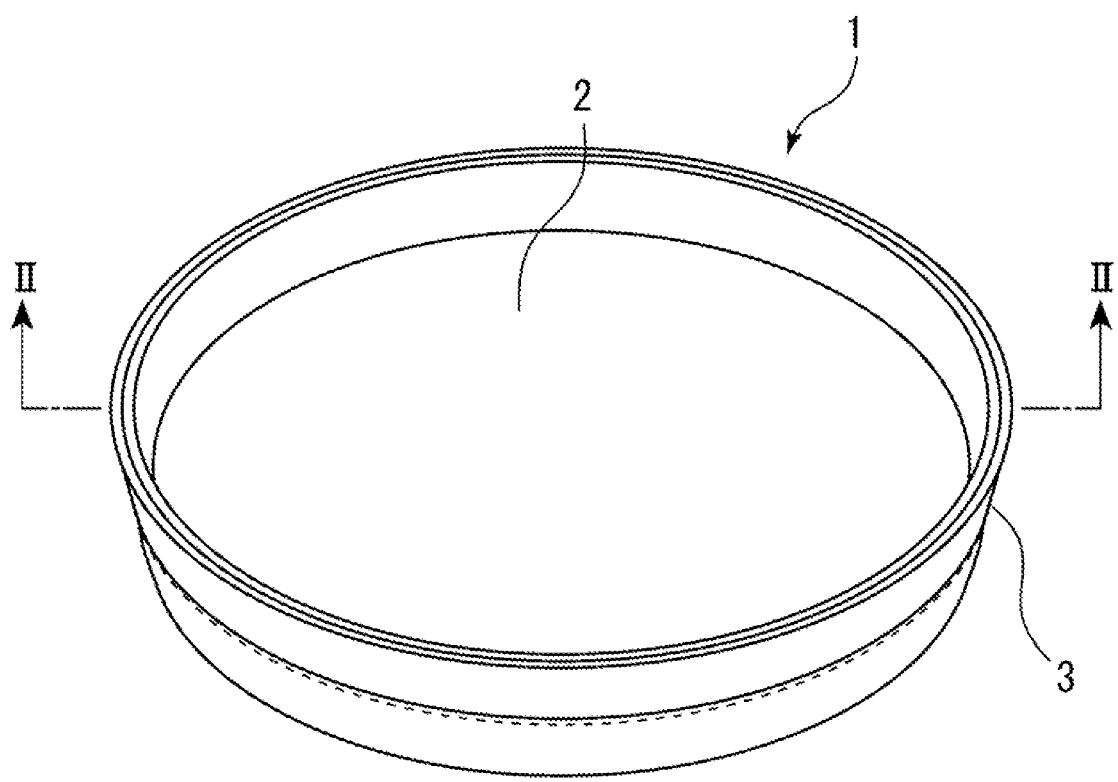
FIG. 1 is a perspective view of an embodiment of the lid of the present invention.
Figure 2:
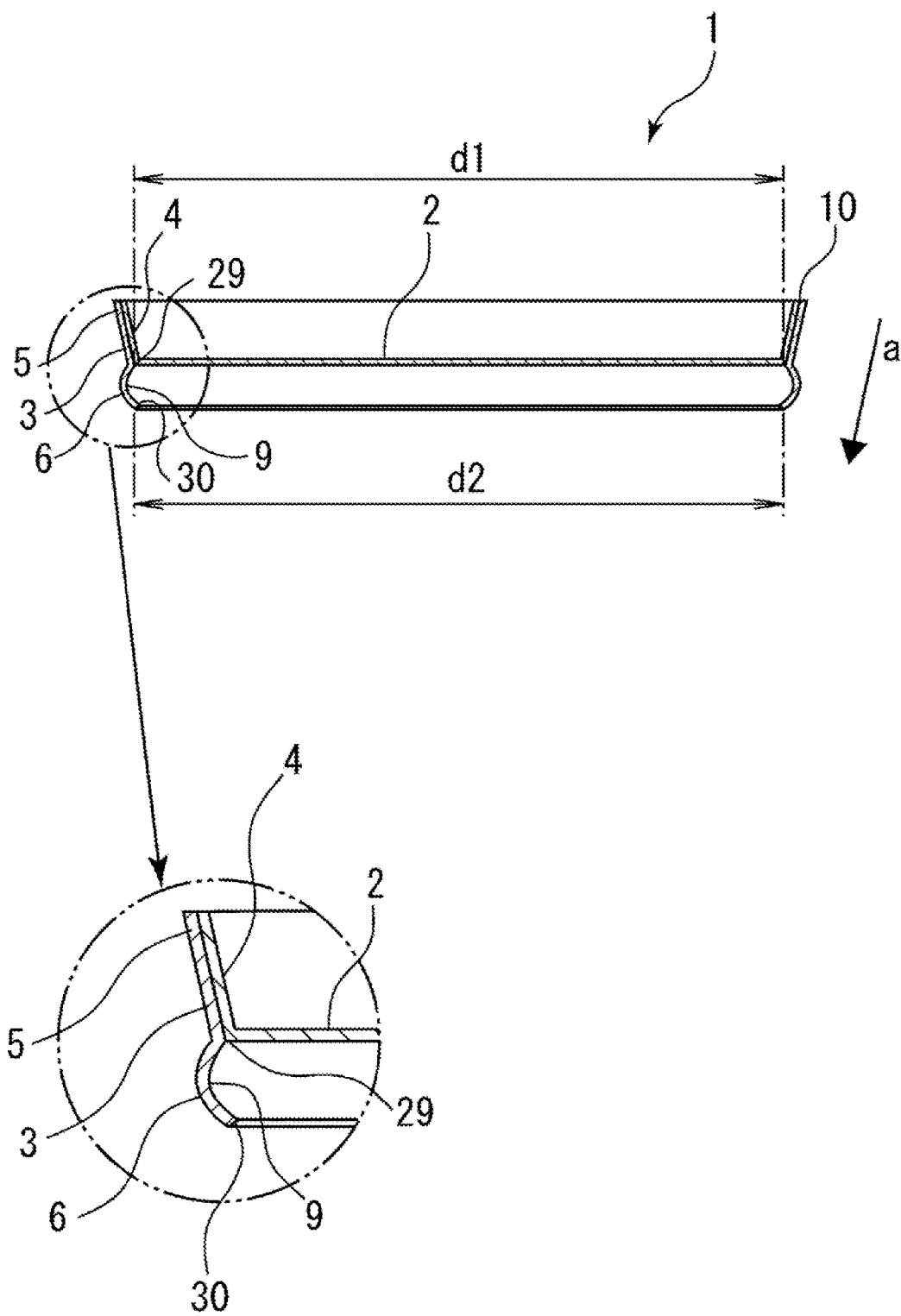
FIG. 2 is a longitudinal sectional view along the Il-Il line of FIG. 1.

FIGS. 1 and 2 show an embodiment of the lid 1 according to the present invention. This lid 1 is made of a cover wall 2 and a side wall 3 surrounding the cover wall 2. The side wall 3 is formed by joining both end parts of a paper material to form an enclosing tube (such that it surrounds the cover wall) and the side wall 3 is tapered from the upper end towards the lower end. The term "the side wall is tapered from the upper end side towards the lower end side" is meant that the outer wall shape is formed to be generally tapered from the upper end towards the lower end, and even if a part of the outer wall of the side wall has e.g. a swell part or a protruded part, such configuration is encompassed in "the side wall is tapered from the upper end side towards the lower end side" as long as it is generally tapered.

Figure 3:
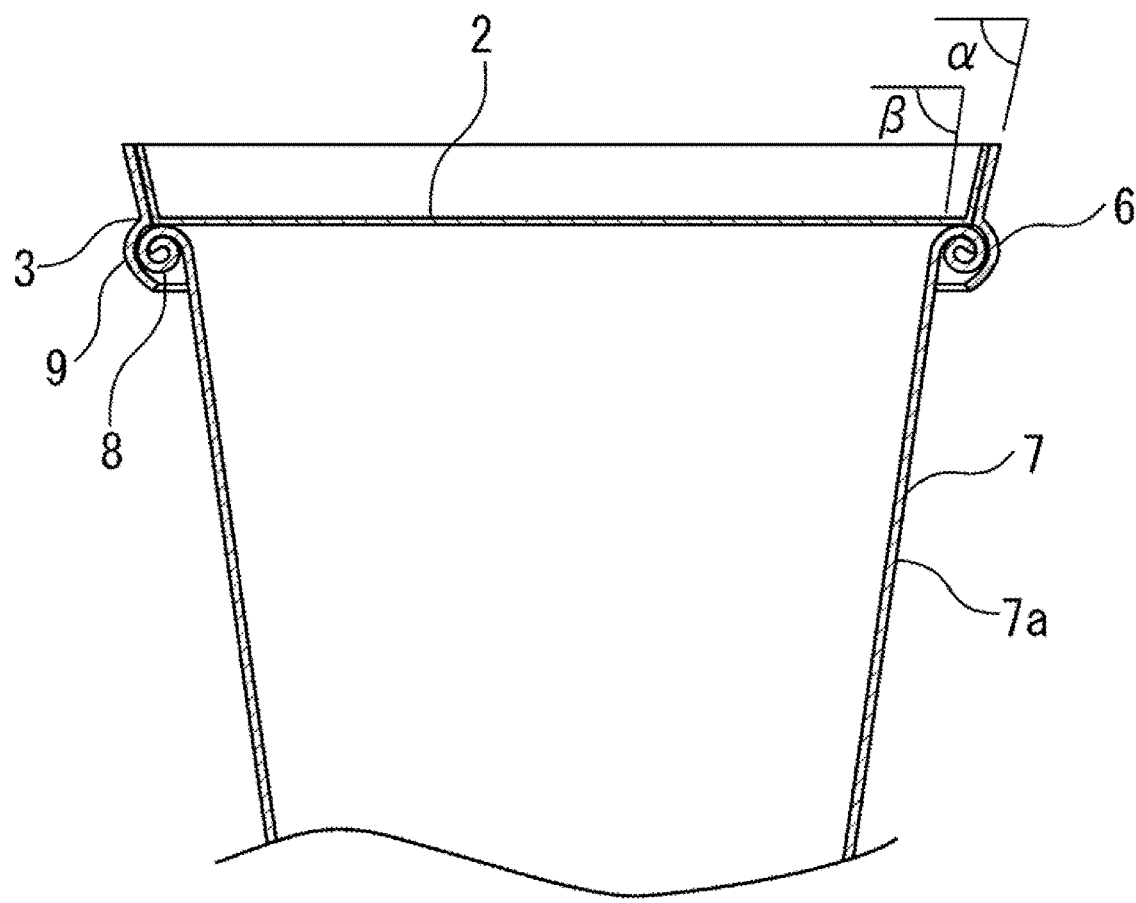
FIG. 3 is a longitudinal sectional view in which the lid covers a container.

The cover wall 2 and the side wall 3 are integrated with each other by joining the standing part 4 made at the circumference of the cover wall 2 by folding with the inner surface side of the upper wall 5 of the side wall 3. In other words, the lid 1 is formed by forming the standing part 4 at the circumference of the cover wall 2 by folding the circumference of a blank material having e.g. a circular shape for forming the cover wall 2 and joining this standing part 4 with the inner surface side of the side wall 3. As shown in FIG. 3, the lower wall 6 of the side wall 3 is provided with an engaging part 9 which is a ring-shaped recess having a shape for engaging with a curled part 8 provided at the opening part of the container 7. The engaging part 9 is not limited to a ring-shaped recess but can have any shape as long as it can engage with the curled part 8 of the container 7. However, when the inner circumference surface of the lower wall 6 of the side wall 3 is pressed to form the engaging part 9 in the form of a ring-shaped recess, the height gap at the joined part formed in the engaging part 9 of the lower wall 6 of the side wall 3 by joining the edges of a paper material having a rectangular or a fan shape can become small, thereby reducing the risk of a gap being formed between the lid 1 and the container 7, increasing the sealability of the lid 1. In the example shown in FIG. 2, the outer surface of the engaging part 9 in the shape of a ring-shaped recess made e.g. by pressing (outer surface of the lower wall 6) has a swelled shape. However, it is possible that the inner surface side of the lower wall 6 is provided with the engaging part 9 in the shape of a ring-shaped recess and the outer surface of the lower wall 6 is not swelled. In order to decrease the height gap at the joining part of the side wall 3, before joining the edge parts of a rectangular or a fan shaped paper material for forming the side wall 3, the areas around said edge parts may be compressed such that their thicknesses gradually decrease towards the direction of the edge parts (direction of the circumference of the side wall 3).

In the lid 1 of this embodiment, the side wall 3 is made from a fan shaped paper material in which the length of the arc at the upper end thereof is greater than the length of the arc at the lower end thereof by joining the side end parts thereof into an enclosing shape. Thus, the side face of the side wall 3 is generally tapered (generally tilted in the direction of the arrow a in FIG. 2) from the upper end towards the lower end (towards the opening part of the container 7) so that the inner diameter d2 at the lower end of the engaging part 9 is smaller than the inner diameter d1 at the upper end of the engaging part 9.

Figure 18:
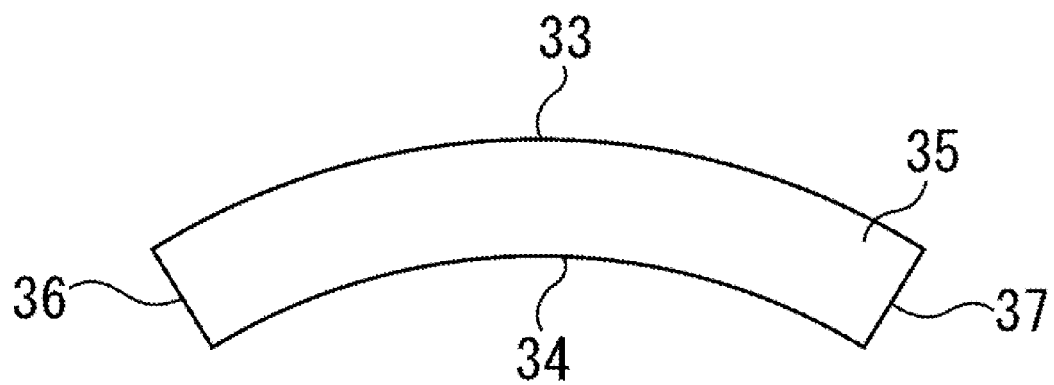
FIG. 18 is a plan view of a blank material for making the side wall.

In other words, in the lid 1 of this embodiment, the side wall 3 is made from a blank material 35 which is annular sector shaped (expanded shape of the truncated cone shaped side wall) in which the length of the arc shaped part 33 at the upper end thereof is greater than the length of the arc shaped part 34 at the lower end thereof (as shown in FIG. 18) by joining the side end parts 36, 37 thereof into an annular shape such that the side end parts 36, 37 face each other in the circumferential direction of the side wall 3. Thus, the side face of the side wall 3 is generally tapered (generally tilted in the direction of the arrow a in FIG. 2) from the upper end towards the lower end (towards the opening part of the container 7) so that the inner diameter d2 at the lower end of the engaging part 9 is smaller than the inner diameter d1 at the upper end of the engaging part 9.

Figure 4:
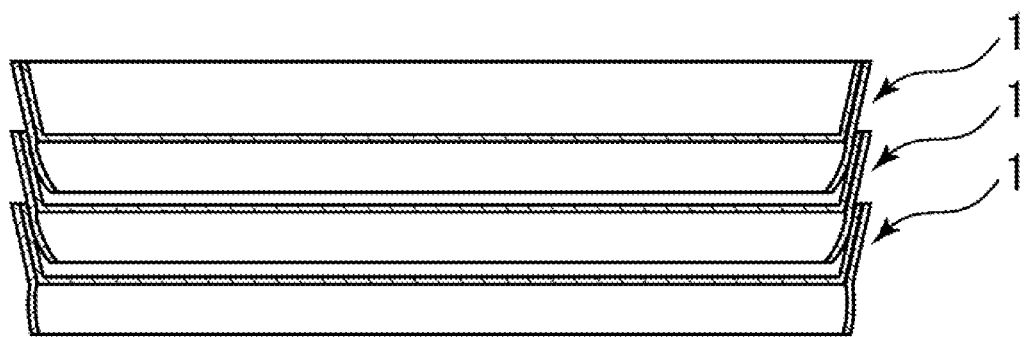
FIG. 4 is a longitudinal sectional view in which the lid bodies are stacked.
Figure 21:
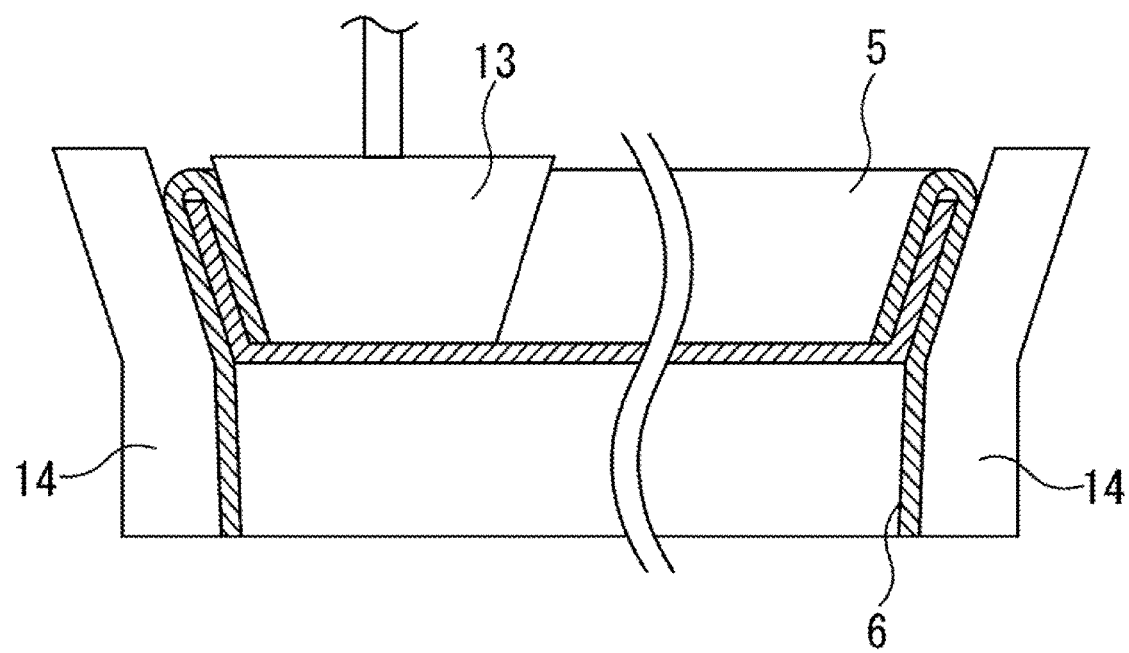
FIG. 21 is a longitudinal sectional view of another embodiment of the lid during manufacturing.
Figure 22:
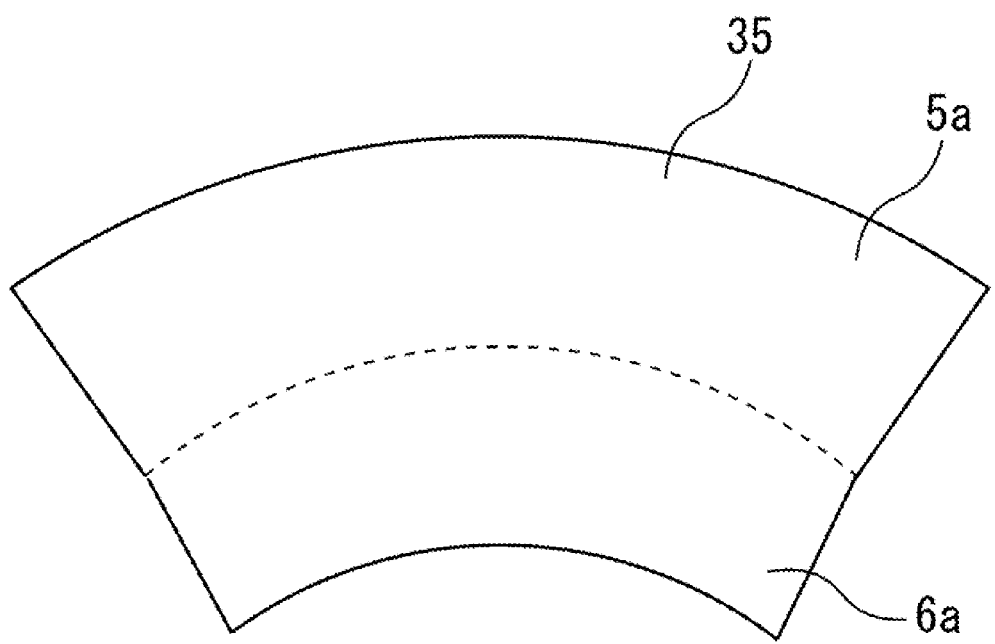
FIG. 22 is a plan view of yet another embodiment of a blank material for making the side wall.
Figure 23:
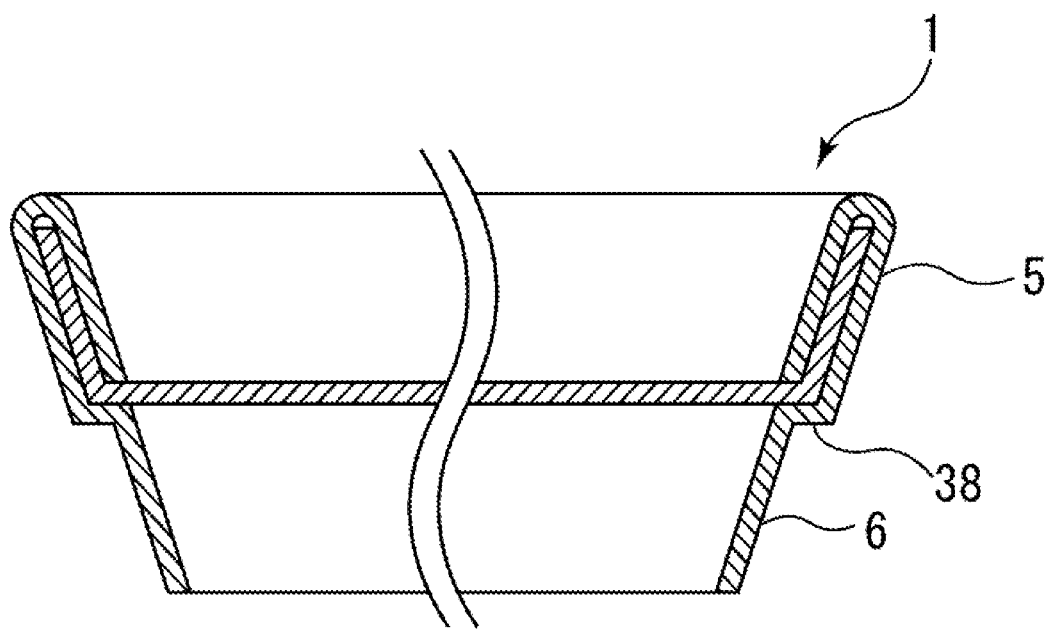
FIG. 23 is a longitudinal sectional view of another embodiment of the lid.

The lid 1 of the present embodiment has a good stackability because the side wall 3 is tapered, and by stacking a plurality of the lid 1 as shown in FIG. 4, it becomes possible to store and transport them using a small space, allowing to reduce the costs for storage and transportation. The side wall 3 is not limited to the example where the side face is tapered. Only a part of the side wall 3, for example the part closer to the upper end or the part closer to the lower end, may be tapered. The part closer to the upper end or the part closer to the lower end of the side wall 3 may have different tilt angles. By arranging it as a tapered tubular shape, the stackability of the lid 1 is improved and the closeability and adhesion of the lid 1 to the container is improved. In particular as shown in FIG. 21, the tit angle of the upper wall 5 may be arranged to be larger than the tilt angle of the lower wall 6. This may be done e.g. by using a die 14 having a form wherein the tilt angle is larger at the upper wall 5 side than the lower wall 6 side and pressing the upper wall 5 from the inner side of the upper wall 5 by the die 13, or by making the side wall 3 by using a blank material 35 having a shape as shown in FIG. 22 comprising an upper wall forming part 5a and a lower wall forming part 6a. Alternatively, as shown in FIG. 23, a step 38 may be formed such that the dimension of the lower wall 6 side is smaller than the dimension of the upper wall 5 side. These further improve the stackability.

In the lid 1 of the present invention, the joining of the end parts of the paper material for forming the tubular side wall 3 and the joining of the cover wall 2 and the side wall 3 may be performed by known joining methods to form an integral part. As the joining methods, methods such as methods using normal adhesives, hot melt adhesives and two component adhesives, heat sealing, ultrasonic bonding and high frequency bonding may be used. However it is preferred in view of the manufacturing efficiency that the surfaces of the cover wall 2 and the side wall 3 to be joined are made of a heat sealable material and the adhesion is performed by heat sealing.

Figure 15:
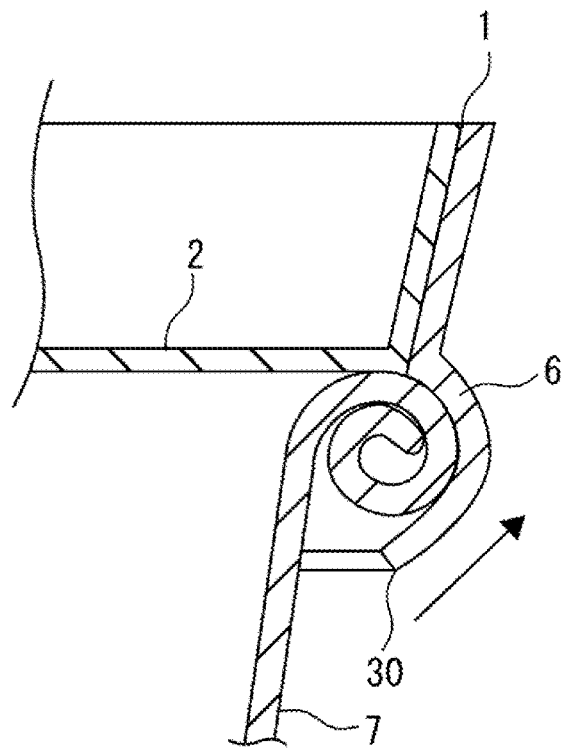
FIG. 15 is an explanatory drawing of the action when the lid is removed from the container.
Figure 15:
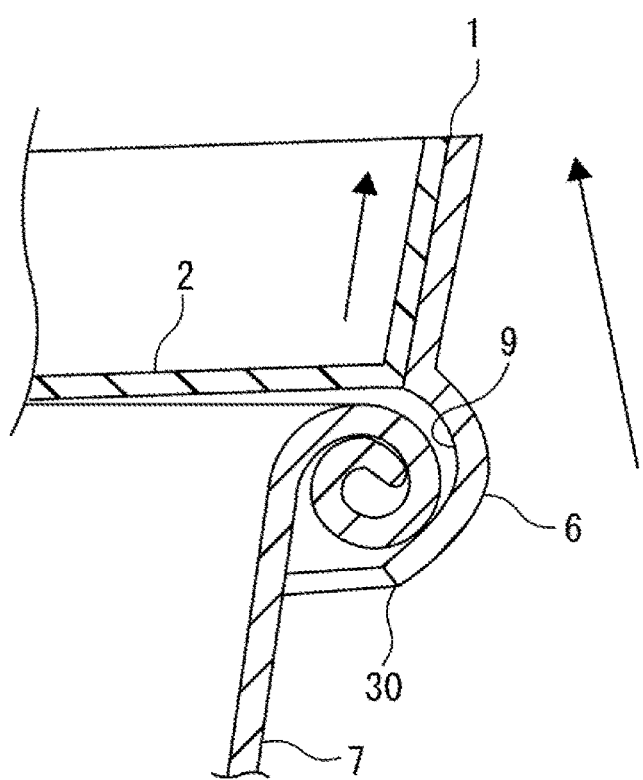
Figure 19:
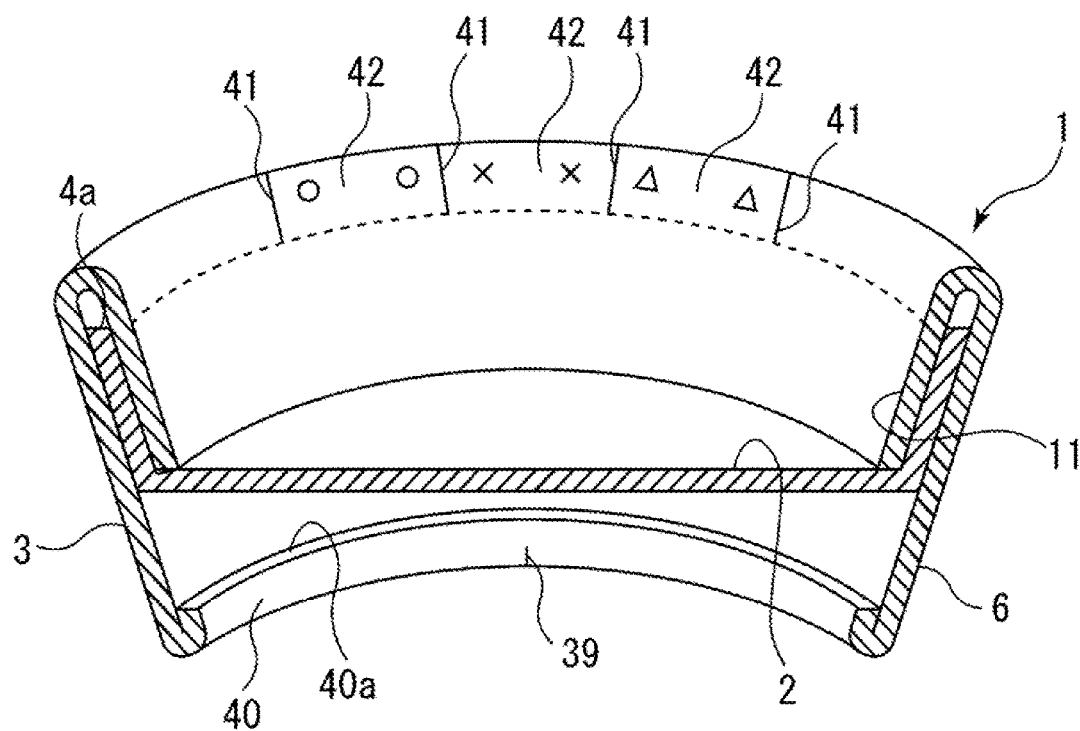
FIG. 19 is a longitudinal sectional view of another embodiment of the lid.

FIG. 3 shows the lid 1 covering the container 7 to close the opening part of the container 7. In the lid 1 of the present embodiment, the engaging part 9 is formed as a ring-shaped recess on the inner wall side of the lower wall 6 of the side wall 3 such that it engages with the curled part 8 of the container 7. The lid 1 of the present embodiment is configured such that when the engaging part 9 is engaged with the curled part 8 of the container 7, the lower end part 30 of the lower wall 6 is not in contact with the side wall 7a of the container 7. The lid 1 of the present invention can close the container 7 with a high sealability, and since the lower wall 6 is elastic (in the inner direction and the outer direction of the lower wall 6) its removal from the container 7 can be done easily. By configuring the lid 1 such that the lower end part 30 of the lower wall 6 is not in contact with the side wall 7a of the container when the lid 1 is attached to the container 7, the removal of the lid 1 from the container 7 becomes even easier. For removing the lid 1 from the container 7, by hooking e.g. a finger onto e.g. the lower end part 30 of the lower wall 6 to pull up the lower wall 6 (arrow direction in FIG. 15A), the curled part 8 of the opening part of the container 7 and the engaging part 9 of the lid 1 disengage, and by pulling the lid 1 upwards (arrow direction in FIG. 15B) the lid 1 can be easily removed from the container 7. In the lid 1 of the present invention, the engaging part 9 which engages with the opening part of the container 7 is provided on the lower wall 6 of the side wall 3 made of an enclosing paper material. The lower wall 6 of the side wall 3 on which the engaging part 9 is provided is more elastic than when the lower wall 6 of the side wall 3 is folded to join with the cover wall 2. Accordingly, even when the diameter of the engaging part 9 of the lid 1 is designed to be smaller than the outer diameter of the curled part 8 of the container 7, the lid 1 can engage with the container 7 with certainty. By designing the diameter of the engaging part 9 to be smaller than the outer diameter of the opening part of the container (the curled part 8), the lid 1 does not easily come off from the container 7 and it can close the container 7 while maintaining a high sealability, even when the pressure inside the container is increased by the container 7 containing a liquid product such as coffee, in particular a hot liquid product. In combination with the side wall 3 being generally tapered from the upper end towards the lower end, it can close the container 7 with a high sealability. As shown e.g. in FIG. 5, FIG. 6 and FIG. 16, a cut 39 may be provided at the lower end edge part of the lower wall 6 according to needs. This allows the lid 1 to be easily attached to and removed from the container 7 even when the lid has a structure wherein the adhesion to the opening part of the container 7 is increased (e.g. a lid which has an engaging part 9 has a diameter smaller than the outer diameter of the curled part 8). A part of the lower end edge part 6 may be folded towards inside of the lower wall 6 as shown in FIG. 19. In this case, by arranging the edge 40a of the folded part 40 to be positioned under e.g. the curled part 8 of the container when the lid 1 is attached to the container, the lid 1 fits better to the container. By providing a cut 39 in the folded part 40, attaching to and removing from the opening part of the container 7 become easy.

Since the lower wall 6 of the side wall 3 of the lid 1 of the present invention is elastic, even when there are dimensional errors in the opening part of the container 7, it can close the opening part of the container 7 with certainty and maintain a high sealability. Since the side wall 3 is tapered from the upper end to the lower end and the standing part 4 extending in an expanding manner (extending from the circumference of the cover wall 2 upwardly in a tilted manner such that it expands) is joined with the inner side of the upper wall 5 of this side wall 3 such that the cover wall 2 and the side wall 3 are integrated with each other, the joining strength between the standing part 4 of the cover wall 2 (meaning the standing part 4 extending upwardly from the circumference of the cover wall 2) and the upper wall 5 of the side wall 3 is increased. Accordingly, when a load is applied to the lid 1, the lid 1 is less likely to e.g. twist and the engaging part 9 and the curled part 8 of the container 7 are less likely to be disengaged. Even when the sealed container 7 containing hot beverages has an increased inner pressure, the lid 1 is less likely to come off. The larger size of the cover wall 2 of the lid 1 leads to the cover wall 2 being more likely to be twisted by a load on the lid 1. By configuring the side wall 3 to be tapered from the upper end to the lower end and the standing part 4 extending in an expanding manner to be joined with the inner side of the upper wall 5 of this side wall 3, the lid 1 is less likely to come off from the container 7 by the load applied on the lid 1 even when the lid is large. In the lid 1 of the present invention, the reliable closed lid state can be maintained by the distance between the lower contact points 29 of the contact part between the standing part 4 of the cover wall 2 and the upper wall 5 of the side wall 3 (for a circular cover wall 2, the diameter of the lower contact points 29) being arranged to be larger than the distance between the lower end parts 30 of the engaging part 9 (for a circular cover wall 2, the inner diameter of the lower end part of the engaging part 9). In the lid 1 of this embodiment, on the upper side of the cover wall 2, a joining part between the upper wall 5 of the side wall 3 and the standing part 4 of the cover wall 2 is formed as a protruded wall 10. When the content of the container 7 is a beverage such as coffee, this protruded wall 10 may be used as the part with which the mouth contacts when drinking the beverage, and also as a wall for preventing the leakage of the beverage. When the lid 1 is used as a lid for a beverage container, the cover wall 2 may be provided with a drinking port 24. The container 7 is not limited to containers having a tilted side wall 7a such as a coffee cup and a cup noodle container, but may also be a cylindrical container such as a nut can. The lid 1 of the present invention may be used for various containers such as a paper container, a plastic container, a foamed plastic container and a metal container, and it can be used as a lid for containers containing liquid as well as for containers of e.g. dried food and containers of e.g. non-food products. The lid 1 of the present invention can be used as a lid for a coffee cup, a cup noodle container a nuts can, as well as for containers of soup, yoghurt, ice cream and various ready-made dishes and for bento boxes. It can also be used as a lid for all kinds of containers not limited to containers of beverage and food.

In the lid of the present invention in which the side wall 3 is tapered from the upper edge towards the lower edge, the tilt angle α of the side wall 3 of the lid 1 and the tilt angle β of the side wall 7a of the container 7 may be the same or different. When they are different, the tilt angle α of the side wall 3 may be larger or smaller than the tilt angle β of the side wall 7a of the container 7. If the tilt angle α is smaller than the tilt angle β (when the tilt is large), the lid 1 fits more strongly to the container 7 and the sealability is increased. The ratio of the tilt angle α of the side wall 3 of the lid 1 with respect to the tilt angle β of the side wall 7a of the container 7 may be arbitrarily changed depending on the variations in e.g. the size of the container 7 (size of the lid 1) in order to increase the sealability of the lid 1. In case of a non-cylindrical container such as a polygon shaped container, the tilt angle α of the side wall 3 of the lid 1 may be changed depending on the variation in the shape of the part of the container to which the lid 1 fits, thereby preventing the sealability from changing by the variations in the container parts.

In the lid 1 of the above embodiment, the upper wall 5 of the side wall 3 and the standing part 4 of the cover wall 2 are configured to be of the same height. However, the heights of the upper wall 5 of the side wall 3 and the standing part 4 of the cover wall 2 do not have to be the same but one of the upper wall 5 of the side wall 3 and the standing part 4 of the cover wall 2 may be configured to be shorter than the other.

The paper material constituting the side wall 3 of the lid 1 may e.g. be a so-called paper, which is obtained by collecting a slurry of a fiber raw material on a net, drying or pressure drying it and making it into a sheet; a so-called air laid sheet obtained by stacking by an air flow a spread fiber raw material such as a crushed pulp obtained by crushing by a crushing machine a raw material sheet made of pulp fibers etc. and fixing the stacked fibers by a binder to each other; and a stack made of these. The paper material may be those consisting of pulp as well as those comprising non-pulp natural fibers and synthetic fibers and regenerated fibers, but preferably comprises at least 50 mass % of pulp, more preferably comprises at least 70 mass % of pulp, more preferably at least 80 mass % and particularly preferably 100 mass % of pulp. The paper material may be a composite material with e.g. a film or a non-woven of a synthetic resin or a natural resin, a wood material such as a wood foil, and an aluminium foil. However, when it is a composite material, the composite material preferably comprises at least 50 mass % of pulp and in particular preferably comprises at least 80 mass % of pulp. The higher pulp content is preferable since the paper material biodegrades more easily. Use can also be made of a transparent paper made from cellulose nanofibers (cellulose microfibril) which is a transparent paper material.

The pulp may be those obtained e.g. from wood pulp, non-wood pulp and waste paper pulp. As the pulp for the pulp material, use can be made of coniferous pulps such as red pine, sakhalin fir, yezo spruce, douglas fur, hemlock, spruce, broadleaf pulps such as beech, oak, birk, eucalyptus, poplar, alder; wood pulps such as a mixture of a coniferous pulp and a broadleaf pulp; non-wood pulps such as kenaf, bagas pulp, bamboo pulp, serial pulp, walla pulp, abaca pulp, cotton pulp; and waste paper pulp. Coniferous pulps have a longer fiber length compared to broadleaf pulps. Accordingly, a paper material using pulps with a long fiber length such as coniferous pulps has a higher degree of fiber entanglement. A crushed pulp made by crushing a raw material sheet of e.g. coniferous pulps has a longer fiber length than a raw material sheet using e.g. broadleaf pulps and thus results in an increased strength of the paper material due to the fiber entanglement.

The paper material is preferably water resistant. A material such as a water resistant paper which has already been provided with water resistance may be used. A paper material provided with a coating layer at least on its surface to be positioned on the container side may also be used. The coat layer may be provided e.g. by sticking a film or applying a coating agent. The coat layer may be made of e.g. polyvinyl chloride, polyvinylidene chloride, polyurethane, polyethylene terephthalate, olefin resins such as polyethylene and polypropylene, polyvinyl alcohol, acrylic resins such as polyacrylic acid and polymethacrylic acid and acrylonitrile-butadiene-styrene copolymers, polyethylene terephthalate, cellophane, nylon, ethylene-vinyl alcohol copolymer, polymethylpentene, polyvinyl acetate, polylactic acid, polycaprolactone, polyhydroxyalkanoate, starch-based resin and combinations of two or more of them. The coat layer is preferably made of biodegradable resins such as polylactic acid, polycaprolactone, polyhydroxyalkanoate, starch-based resin, which increases the biodegradability. Regarding the coat layer, compared to forming it by sticking a film, forming it by applying a coating agent is preferred since the recyclability is better.

The cover wall 2 of the lid 1 of the present invention may be made of a paper material similar to the side wall 3. Aside from the paper material, it may also be made of a film or sheet material. If the cover wall 2 is made of a film or sheet material, the bendability is higher than when the cover wall 2 is made of a paper material and thus it becomes easier to fit the lid 1 to the container 7. If it is made of a transparent film or sheet material, when it is attached to the container 7, the content of the container 7 may be easily determined visibly. The film and the sheet material may be made of e.g. polyvinyl chloride, polyvinylidene chloride, polyurethane, polyethylene terephthalate, olefin resins such as polyethylene and polypropylene, polyvinyl alcohol, acrylic resins such as polyacrylic acid and polymethacrylic acid and acrylonitrile-butadiene-styrene copolymers, polyethylene terephthalate, cellophane, nylon, ethylene-vinyl alcohol copolymer, polymethylpentene, polyvinyl acetate, polylactic acid, polycaprolactone, polyhydroxyalkanoate, starch-based resin, glassine paper, cellophane paper, nitrate paper, paraffine paper and their combinations. Preferably it is made of biodegradable resins such as polyvinyl acetate, polylactic acid, polycaprolactone, polyhydroxyalkanoate and starch-based resin. A paper provided with an aluminium layer e.g. by deposition and a laminate in which e.g. a paper is provided on its surface with an aluminium layer and further with a laminate layer or a coating layer of e.g. polyethylene or polypropylene on one or both sides thereof may also be used. When the cover wall 2 is made of a film or sheet material, in case a material which is difficult to be heat sealed such as PET is used, the adhesion by heat sealing can be easily done if the surface which joins the side wall 3 is coated with e.g. polyethylene or polypropylene (e.g. OPP, CPP). When the cover wall 2 is made of a film or sheet material, the film or sheet material may be colored or non-colored and transparent, semi-transparent or non-transparent. Use can also be made of a transparent paper made from cellulose nanofibers (cellulose microfibril) which is a transparent paper material.

With the lid 1 of the present invention, both when the cover wall 2 is made of a paper material and when the cover wall 2 is made of a film or sheet material, if the side of the cover wall 2 which contacts with the opening part of the container 7 is made of a heat sealable material, the cover wall 2 may be joined with the opening part of the container 7 (curled portion 8 of the container 7 in the embodiment shown in FIG. 3) by heat seal, and the lid 1 may be removed from the container 7 by removing the seal when in use. This allows the content of the container 7 to be blocked from the outside air until use. When the cover wall 2 is made of a film or sheet material, it is preferable that a material having a low air permeability and a low moisture permeability is used, since this increases the blocking property against the outside air. As the paper material to be used for the lid 1, those having a basis weight per area of around 150 g/m$^2$ to 400 g/m$^2$ is used, more preferably 160 g/m$^2$ to 360 g/m$^2$, more preferably 170 g/m$^2$ to 350 g/m$^2$.

Figure 14:
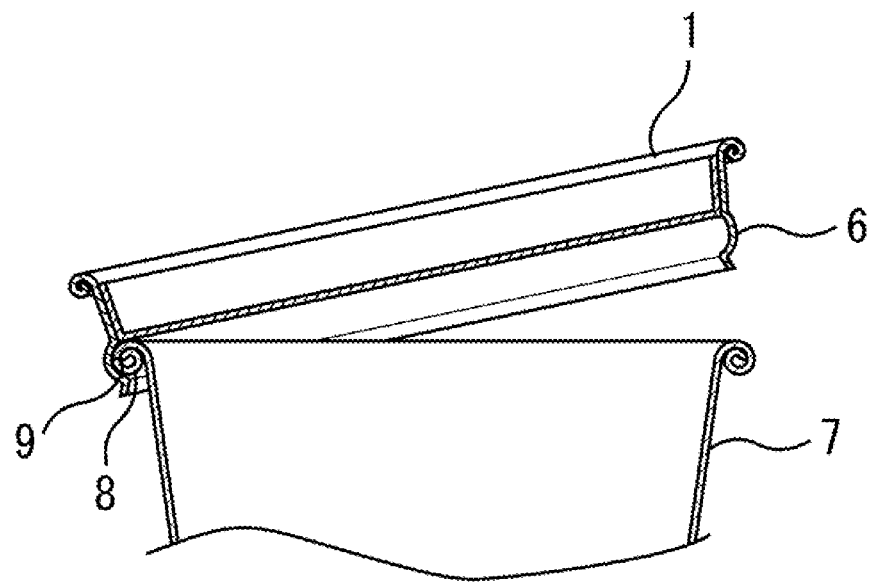
FIG. 14 is an explanatory drawing of the action when the lid is attached to the container.
Figure 14:
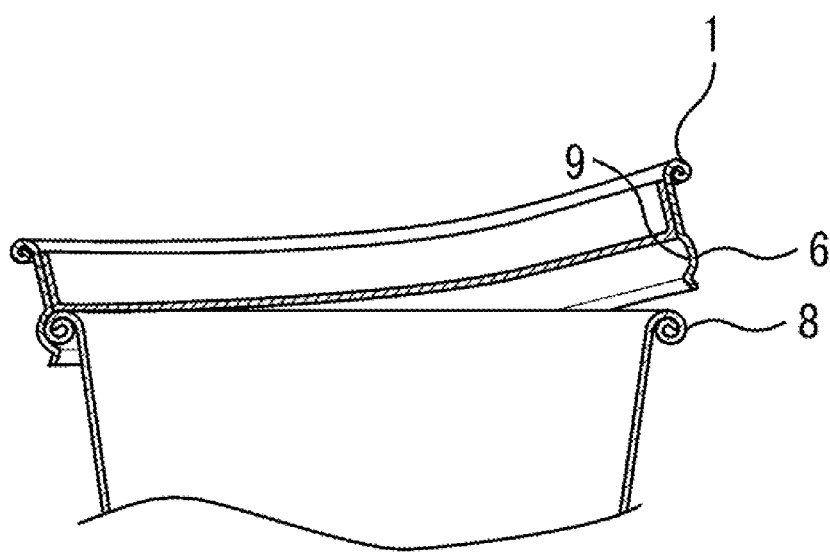

For closing the container 7 (comprising a curled part 8 at its opening part) by the lid 1 of the present invention, first, as shown in FIG. 14A, the engaging part 9 at one edge of the lid 1 is fitted to the curled part 8 of the container 7, and subsequently as shown in FIG. 14B, the engaging part 9 is successively fitted to the curled part 8 towards the opposite side of the lid 1, and the engaging part 9 at the other end of the lid 1 is fitted to the curled part 8 of the container 7 by warping the cover wall 2. Thus the lid 1 can be fitted to the container 7 to close it. The lid 1 of the present invention has an overall flexibility and the lower wall 6 of the side wall 3 has elasticity in the thickness direction. Accordingly, even when the inner dimension of the lower edge part of the lower wall 6 is smaller than the outer dimension of the opening part of the container 7, the lid 1 can fit to the container 7. The opening part (curled part 8) of the container on one hand and the inner surface of the lower wall and the lower surface of the cover wall of the lid 1 on the other hand closely contact with each other and thus the container 7 can be closed with certainty with a high sealability.

The lid 1 of the present invention can maintain the high sealability by fitting to the opening part of a container not limited to a container having a curled part.

Further Embodiment

Figure 5:
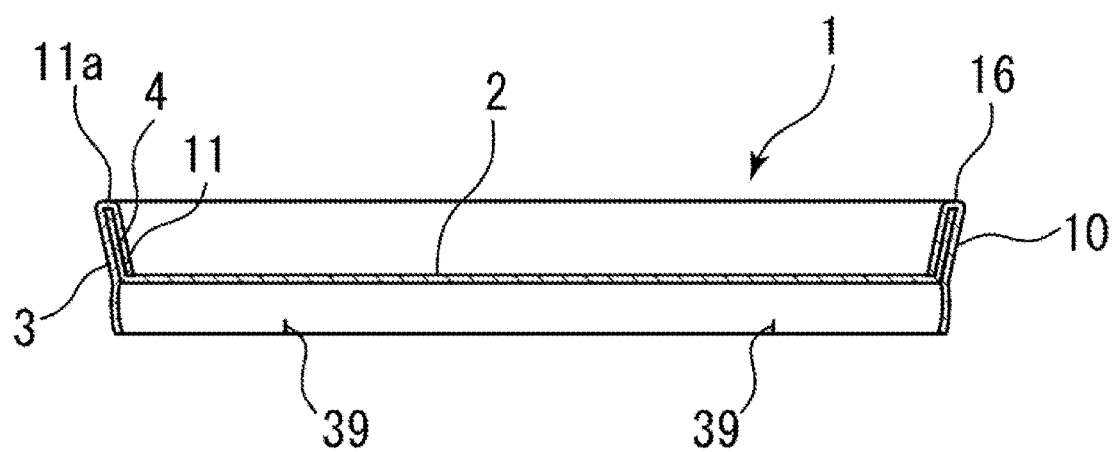
FIG. 5 is a longitudinal sectional view of a different embodiment of the lid.
Figure 6:
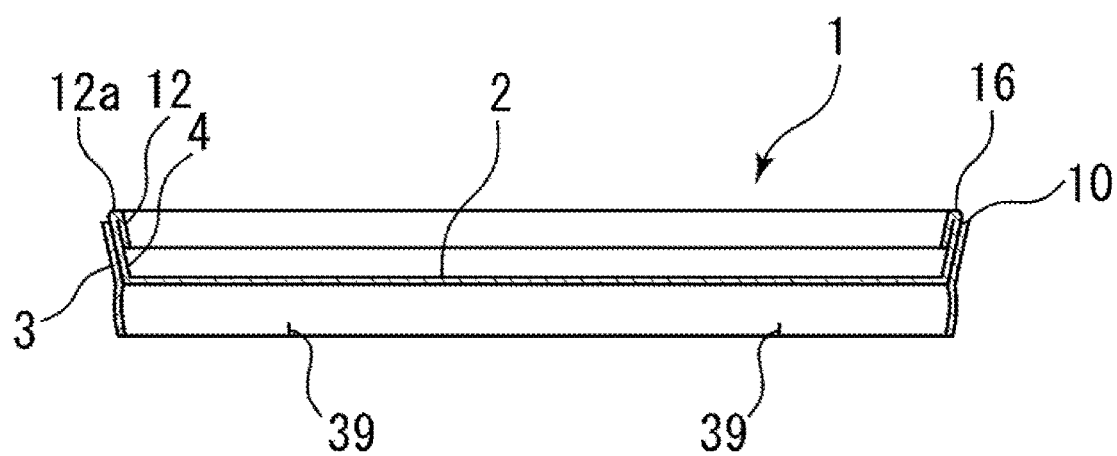
FIG. 6 is a longitudinal sectional view of yet another embodiment of the lid.

FIG. 5 shows a different embodiment of the lid 1 of the present invention. In the lid 1 of this embodiment, a folded part 11 is provided by folding the upper wall 5 of the side wall 3 inwardly to enclose the standing part 4 of the cover wall 2. FIG. 6 shows a state in which the folded part 12 is formed by folding inwardly the upper end part of the standing part 4 of the cover wall 2. By providing a folded part 11, 12 shown in FIG. 5 and FIG. 6 to provide a rounded part 16 at the upper edge of the protruded wall 10, the feeling to the mouth is improved when the mouth touches the protruded wall 10 when drinking the beverage in the container 7. In the folded part 11, 12, the folded inner sides may be joined. In the embodiment shown in FIG. 5, if the parts where the inner side of the upper wall 5 and the standing part 4 of the cover wall 2 contact each other are heat sealable, the folded part 11 can be easily joined with the standing part 4 of the cover wall 2. In the embodiment shown in FIG. 6, if the upper side of the cover wall 2 is heat sealable, the folded part 12 can be easily heat sealed. Like the lid 1 shown in FIG. 6, in the cases where the standing part 4 of the cover wall 2 is folded inwardly to provide a folded part 12, if the rounded part 16 protrudes higher than the upper edge of the side wall 3, the feeling to the mouth is further improved. Although not shown, similar effects can be obtained by providing a folded part by folding the upper end part of the side wall 3 outwardly of the side wall or providing a folded part by folding outwardly the upper end of the standing part 4 of the cover wall 2 to enclose the upper end part of the side wall 3. The length of the folded part 11, 12 may be the same as the length of the standing part 4 of the cover wall 2 or may be shorter than the standing part 4.

Figure 7:
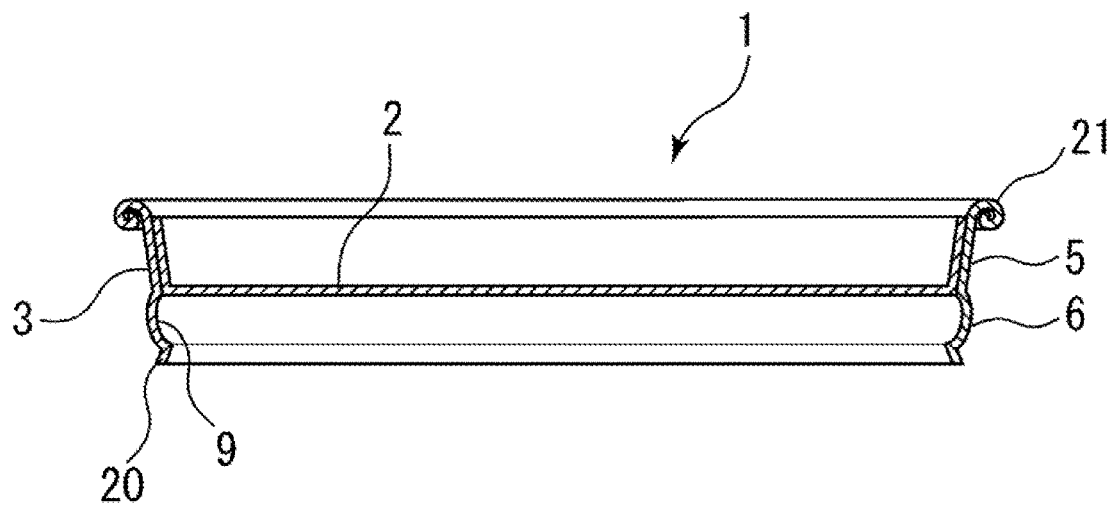
FIG. 7 is a longitudinal sectional view of yet another embodiment of the lid.
Figure 8:
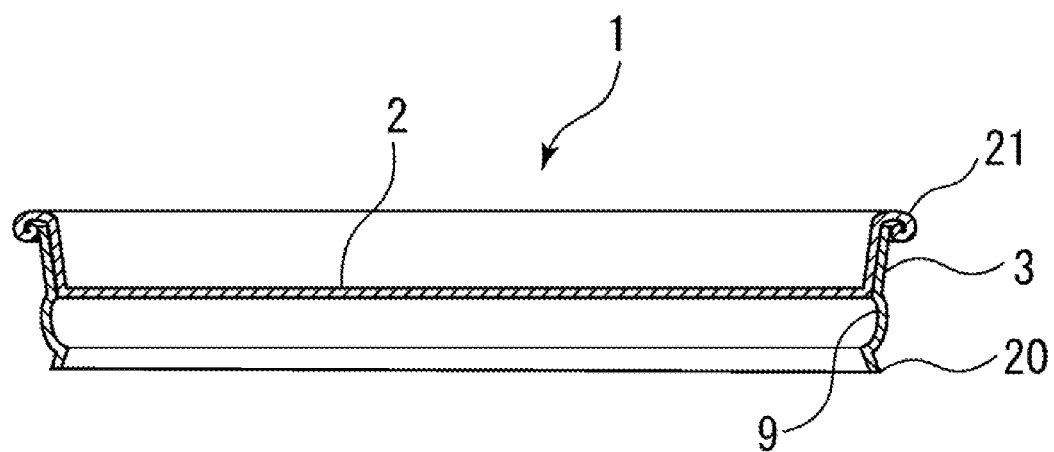
FIG. 8 is a longitudinal sectional view of yet another embodiment of the lid.

In the lid 1, the lower wall 6 of the side wall 3 may be provided with a piece part (guide part) 20 which extends from the lower end part of the engaging part 9 towards the outer circumferential direction, as shown in FIG. 7. By providing such piece part 20, the engagement and attachment of the lid 1 to the opening part of the container 7 becomes easy even when the diameter of the engaging part 9 (especially the inner diameter of the lower edge part of the engaging part 9) is designed to be smaller than the outer diameter of the opening part of the container 7 or the outer diameter of the opening part of the container 7 is larger than the diameter of the engaging part 9 of the lid 1 due to the variations in the container dimensions. The lid 1 may be provided with a curled part 21 at the upper edge of the lid 1 as shown in FIG. 7, depending on needs. The example shown in FIG. 7 shows a situation wherein the curled part 21 is provided by curling the upper end part of the upper wall 5 of the side wall 3. However, the curled part 21 may also be provided by curling the upper end part of the standing part 4 of the cover wall 2 as shown in FIG. 8. Although not shown, the curled part 21 may be provided by curling the upper end parts of the upper wall 5 of the side wall 3 and the upper end part of the standing part 4 of the cover wall 2 as a stack. By providing a curled part 21 at the upper end part of the lid 1, the feeling to the mouth when drinking beverages such as coffee is improved. The lid 1 of the present invention strongly engages with the opening part of the container 7 to close the opening part of the container and thus does not easily come off. However, the presence of the curled part 21 makes the removal of the lid 1 easy since the curled part 21 becomes the holding part when removing the lid 1 from the container 7. Providing the curled part 21 such that the joined end part of the upper wall 5 of the side wall 3 and the standing part 4 of the cover wall 2 is covered by the curled part 21 (as shown in the lid 1 shown in FIG. 8) or covering the joined end part by the folded part 11 (as shown in FIG. 5) is preferred, as the beverage is less likely to soak in from the joined edge part. When a plurality of the containers 7 closed by the lid bodies 1 of the present invention are displayed or stored side by side, the lib body 1 not having the curled part 8 around it such as the lid 1 provided with the folded part 11, 12 can save space since its outer dimension can be smaller compared to the lid 1 comprising a curled part 8. Also, compared to the one provided with a curled part 8, the lid 1 can be made to have a smaller overall height of the side wall 3 and thus the material used for the lid 1 can be saved to reduce the cost.

The provision of the folded part 11, 12 or the curled part 21 at the upper edge of the lid 1 increases the strength of the upper part of the lid 1 in which the upper wall 5 of the side wall 3 and the standing part 4 of the cover wall 2 are joined. This makes the cover wall 2 to be less easily twisted by the load onto the lid 1, thus it becomes even less likely that the lid 1 comes off by an outer force.

Description of Yet Another Embodiment

Figure 16:
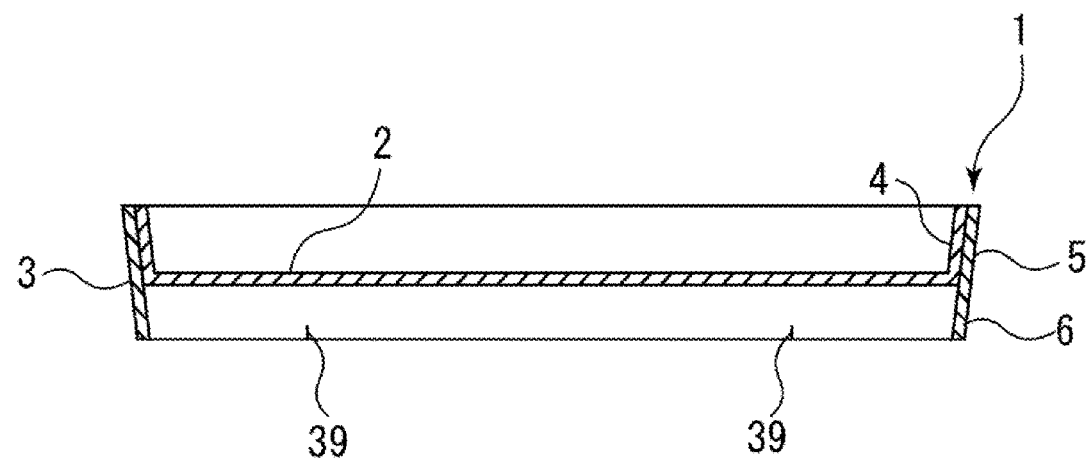
FIG. 16 is a longitudinal sectional view of yet another embodiment of the lid.

FIG. 16 shows yet another embodiment of the lid 1. This lid 1 is not provided with an engaging part 9 in the form of a ring-shaped recess on the inner side of the lower wall 6. It has a structure in which the container is closed by the contact between the flat surface of the inner side of the side wall 3 and the opening part (e.g. its curled part 8) of the container 7 when the lid 1 is fitted to the opening part of the container 7. In the lid 1 having this structure, in order to increase the sealability of the container 7, for example, the friction of the part of the inner side of the lower wall 6 which contacts the opening part of the container 7 may be increased, the inner dimension of the lower end of the lid 1 may be designed to be smaller than the outer dimension of the opening part of the container 7, or the tilt angle α of the side wall 3 of the lid 1 may be designed to be smaller than the tilt angle β of the side wall 7a of the container 7. In the lid 1 of the present invention, the lower end part of the side wall which engages with the opening part of the container does not have an overlapping structure of paper materials and thus is elastic. Accordingly, even when the inner dimension of the lower end of the lid 1 is designed to be smaller than the outer dimension of the opening part of the container 7, it can be easily fitted to the opening part of the container 7.

Figure 9:
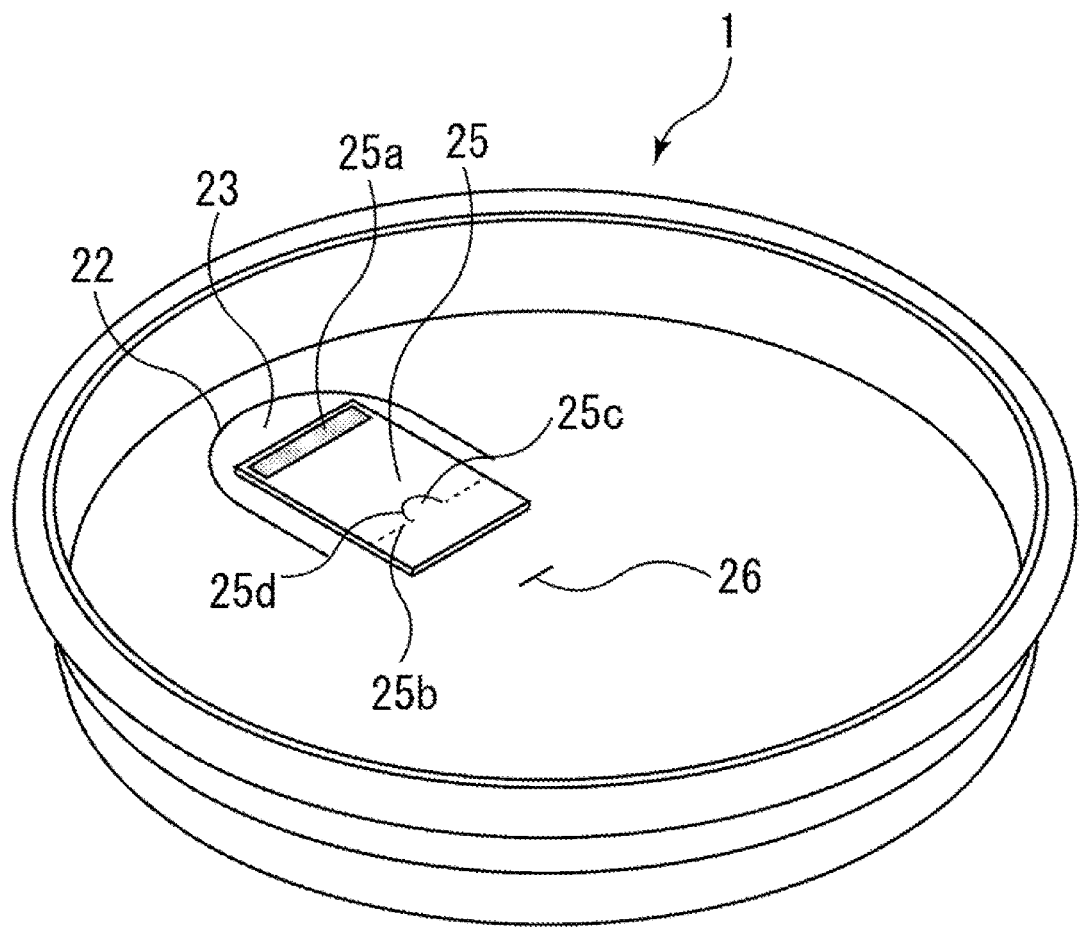
FIG. 9 is a perspective view of yet another embodiment of the lid.
Figure 10:
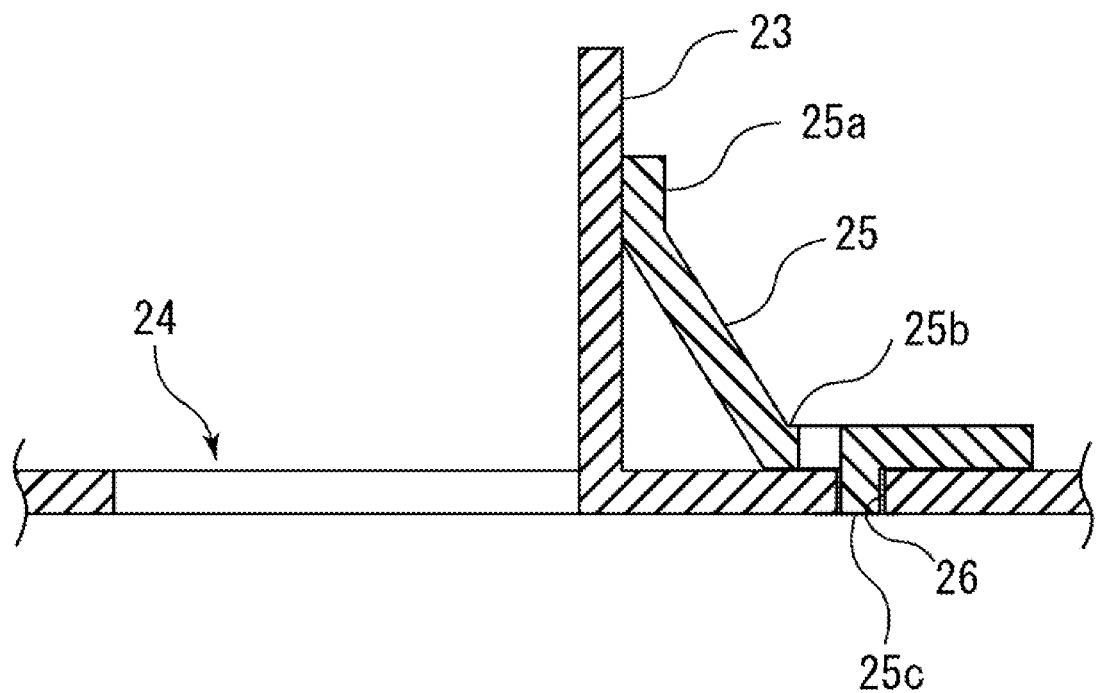
FIG. 10 is a cross sectional view of the area around a drinking port wherein the drinking port was formed by lifting a lid piece of the lid of FIG. 9.

FIG. 9 shows an example in which the lid 1 of the present invention is used as a lid of a beverage container. In this lid 1, the cover wall 2 is provided with a lid piece 23 made by a cut 22 for providing a drinking port 24 (FIG. 10). A holding piece 25 for pulling up the lid piece 23 is joined to the lid piece 23 via a joining part 25a provided at one end thereof e.g. by heat seal. A folding part 25b is provided at the other end of the holding piece 25 and a protrusion piece 25c is provided around the center of the folding part 25b by a cut 25d. In this lid 1, by pulling up the lid piece 23 by holding the holding piece 25, a drinking port 24 is opened. When the lid piece 23 is pulled up by holding the holding piece 25, the holding piece 25 is folded at the folding part 25b and at this time the protrusion piece 25c protrudes towards the bottom side of the holding piece 25. The protruded protrusion piece is inserted into a holding hole 26 provided in the cover wall 2 and holds the holding piece 25 to keep the drinking port open. This holding hole 26 also functions as a depressurizing hole of the container 7. A resealable adhesive may be provided on the side of the holding piece 25 facing the cover wall 2, which allows the opening and closing of the drinking port 24 by the holding piece 25 to be done repeatedly and easily. However, the adhesion of the resealable adhesive may decrease during repeated use. The decrease in the adhesion makes it difficult to keep the lid piece 23 in its pulled up state, which may make it not possible to maintain the drinking port 24 to be open. In comparison, as shown e.g. in FIG. 9, by configuring a protrusion piece 25c of the holding part 25 to be inserted in the holding hole 26 of the cover wall 2 to maintain the open state of the drinking port 24, even if the lid piece 23 is repeatedly opened and closed, the drinking port 24 can be kept open with certainty by the lid piece 23. Further, the holding piece 25 may be made to be smaller than when the lid piece 23 is held by a holding piece 25 provided with an adhesive. The cut 22 may be half-cut or perforated. When the cut 22 is half-cut, a high sealability can be maintained before opening the lid piece 23, preventing the content from overflowing by the increase in the vapor pressure inside the container and the lid 1 accidentally coming off from the container 7. In addition to or alternatively to the cut for forming the drinking port 24, a cut of e.g. a cross-shape for inserting a straw may be formed, and for a container for instant yakisoba, a cut for forming an opening for draining hot water may be provided.

Figure 11:
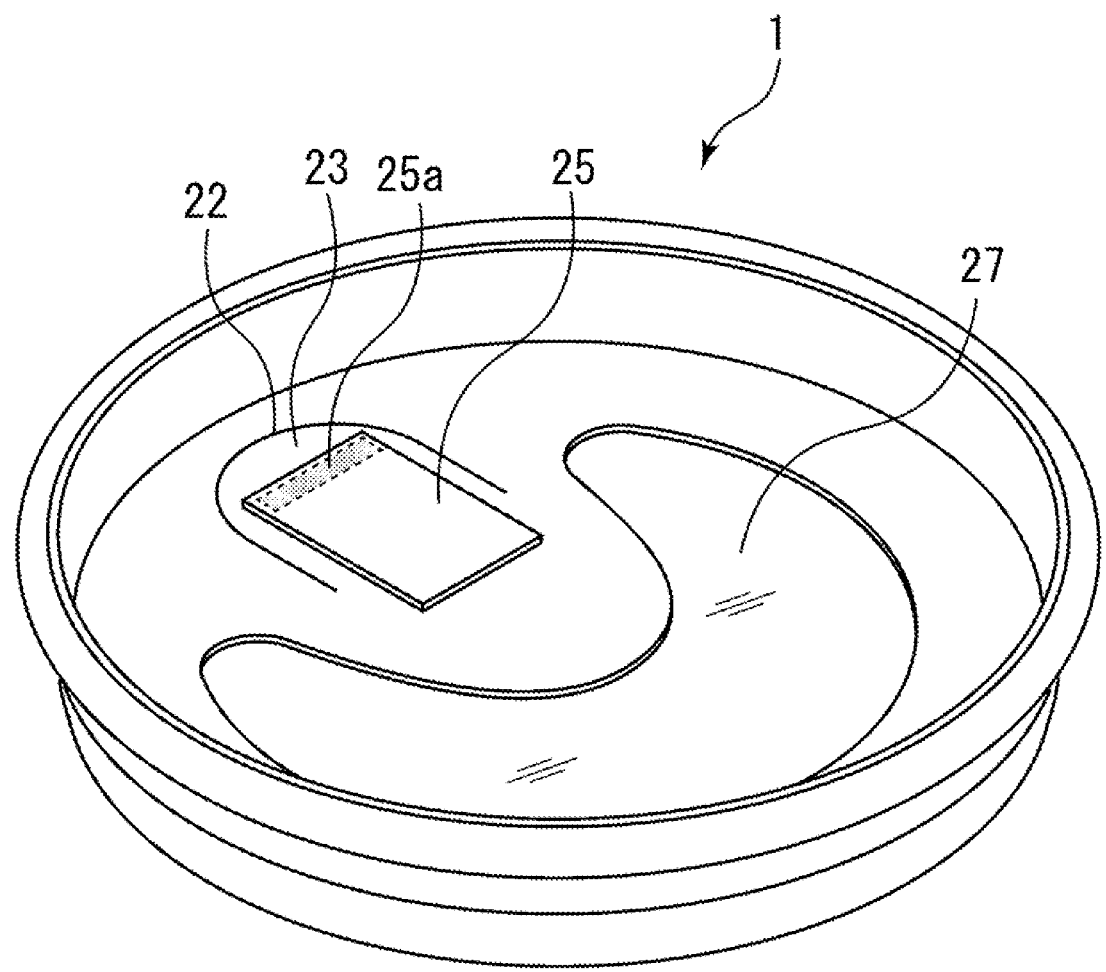
FIG. 11 is a perspective view of a further different embodiment of the lid.

FIG. 11 shows a lid 1 in which a part of the cover wall 2 made of a paper material is provided with a window 27 provided with a transparent material adhered to it. The window 27 may be formed by providing a hole on the cover wall 2 and adhering e.g. a colored or non-colored, transparent or semi-transparent (resin) film, a cellophane paper or a glassine paper to it or by using a transparent paper made from cellulose nanofibers (cellulose microfibril) which is a transparent paper material. By providing a window 27 provided with a transparent or semi-transparent material adhered to it, leakage of the content of the container 7 can be prevented and the content of the container 7 can be checked without removing the lid 1 from the container 7. The shape of the window 27 is not limited to that shown and can be formed to have any size or shape. In the lid 1 of this embodiment, a cut 22 is made in the part of the cover wall 2 made of a paper material to provide a lid piece 23, and a holding piece 25 for pulling open the lid piece 23 is provided by joining one end thereof to it by e.g. heat seal. In cases where the cover wall 2 is wholly made of a film or sheet material, although not shown, when one end of a holding piece 25 provided on its back side with a resealable adhesive layer is joined to the lid piece 23 by e.g. heat seal and the holding piece 25 is arranged to entirely cover the cut 22, the sealability before the lid piece 23 is pulled up to form an opening is increased. Also, when the lid piece 23 is pulled up to form an opening, by adhering the holding piece 25 to the cover wall 2, the lid piece 23 can be easily maintained in the open state.

Figure 12:
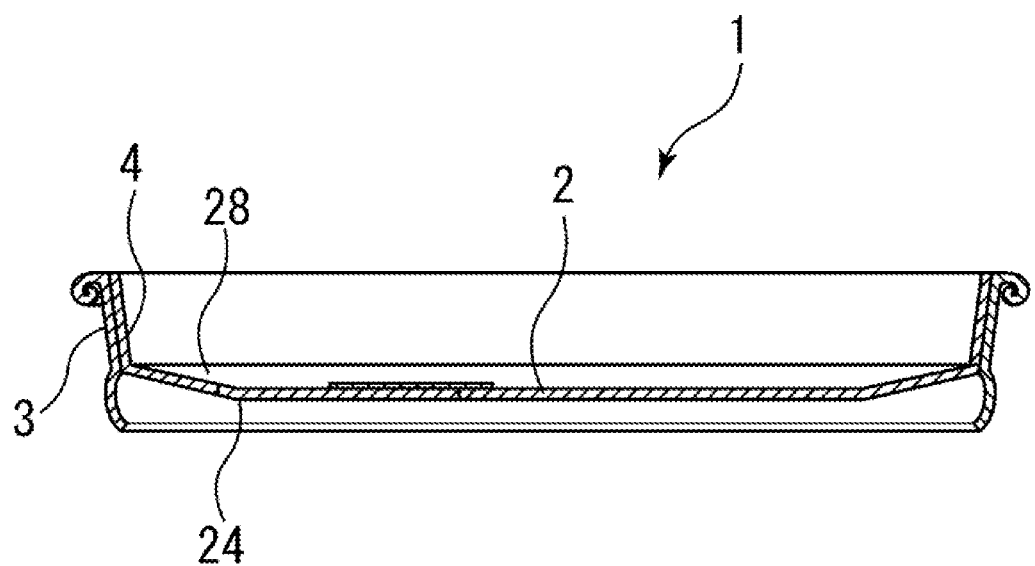
FIG. 12 is a longitudinal sectional view of yet another embodiment of the lid.

FIG. 12 shows an example of the lid 1 in which a recessed part 28 is provided which recesses from the circumference of the standing part 4 of the cover wall 2 (circumference of the cover wall 2 provided with the standing part 4) towards the inner side of the cover wall 2. By providing a recessed part 28 which recesses from the circumference of the standing part 4 towards the inner side of the cover wall 2 and providing a drinking port 24 around the recessed part 28, the beverage which came out of the opening easily goes back from the drinking opening 24 to inside the container 7 after drinking, reducing the risk that it spreads over the cover wall 2 to make the upper surface of the cover wall 2 dirty. The recessed part 28 may be formed to generally recess from the circumference of the standing part 4 of the cover wall 2 towards the center part of the cover wall 2 or a part of the cover wall 2 may be formed into a recess. When a part of the cover wall 2 is formed into a recess, it is preferred that the drinking port 24 is provided in the recessed part.

Figure 17:
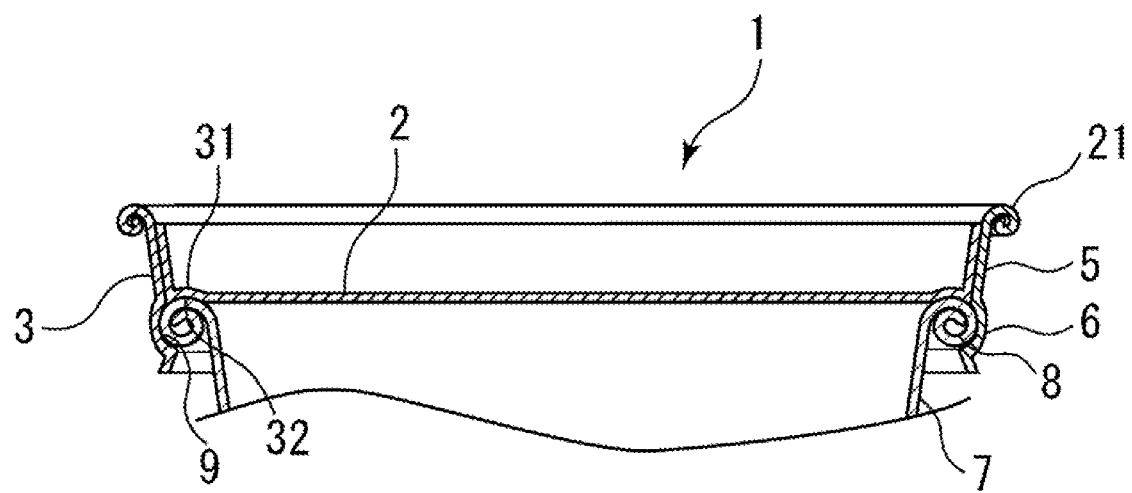
FIG. 17 is a longitudinal sectional view of yet another embodiment of the lid.

Also as shown in FIG. 17, a surrounding ridge 31 may be provided at the circumference of the joining part of the outer side of the cover wall 2 and the side wall 3. Like in the situation where the recessed part 28 is provided, this also allows the remainder of the beverage which came out to easily go back from the drinking port (not shown) to inside the container 7, lowering the risk that it spreads over the cover wall 2 making the upper side of the cover wall 2 dirty. By forming on the inner side of the surrounding ridge 31 (inner surface side of the cover wall 2) a recess 32 having a shape which contacts the curled part 8 of the container 7, the sealability can be increased because the contact area between the curled part 8 of the container 7 and the lid 1 is increased.

Figure 13:
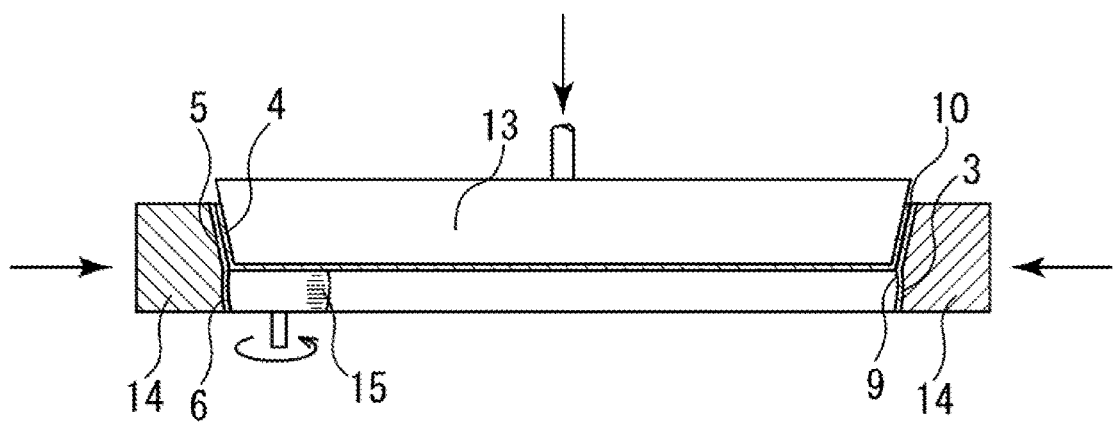
FIG. 13 is a longitudinal sectional view showing an example of a method for manufacturing the lid of the present invention.

FIG. 13 shows an example of a method for manufacturing the lid 1 of the first embodiment. As shown in FIG. 13, the lid 1 of the present invention can be obtained by e.g. holding the cover wall 2 and the side wall 3 by the dies 13, 14 from the arrow directions to shape them, joining the standing part 4 of the cover wall 2 and the inner surface of the upper wall 5 of the side wall 3, and by rotating the die 15 for making the engaging part while moving it along the inner circumference of the lower end part 30 of the side wall 3 and pressing the lower end part 30 to form the engaging part 9. By using a material having heat sealability between the standing part 4 of the cover wall 2 and the inner surface of the upper wall 5 of the side wall 3 and using a die with a heating means, the cover wall 2 and the side wall 3 can be easily joined to be integrated with each other.

In the lid 1 shown in the above embodiment, the engaging part 9 is formed as a surrounding groove at the inner circumference of the lower end part 30 of the side wall 3 made by pressing the lower end part 30 of the side wall 3. However, as long as the engaging part 9 is configured to engage with the opening part of the container 7, the engaging part 9 does not have to be a groove and the shape and the structure of the engaging part 9 may be changed in any manner. Also in the cases where the engaging part 9 is formed as a groove, the outer surface of the lower wall 6 does not have to be protruded as shown.

In the lid 1 of the present invention, as shown in FIG. 19, cuts 41 may be provided at the upper end edge part of the lid 1, and the upper end edge part may be provided with tags 42 which are arranged to be foldable by the cuts 41. By providing a representation of the container content by the tags 42 and e.g. by folding the tag representing the corresponding type of the container content, the container content can easily be identified. As in the lid 1 as shown in FIG. 19, the tags 42 may be formed by providing cuts 41 at the upper end part 11a of the folded part 11 which is made by folding the upper part of the side wall 3 towards the standing part 4 of the cover wall 2. In this case, when the upper end 4a of the standing part 4 of the cover wall is arranged to be shorter than the inner side part of the upper end part 11a of the folded part 11 and the cuts 41 are arranged at the gap between the upper end part 11a of the folded part 11 and the upper end 4a of the standing part 4 of the cover wall 2, the folding of the tags 42 becomes easy.

Figure 20:
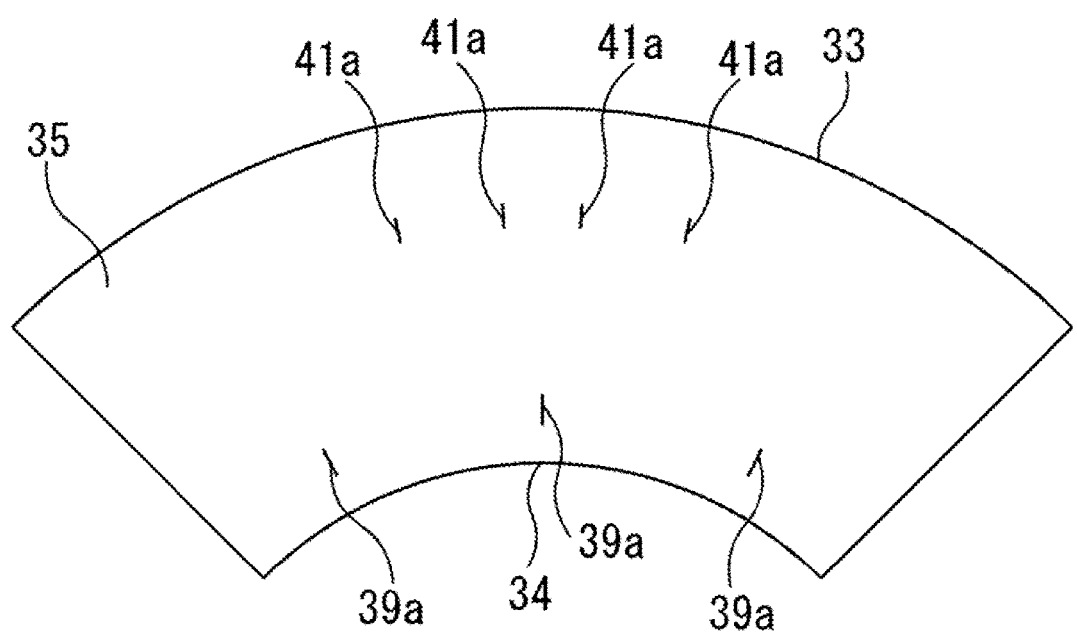
FIG. 20 is a plan view of another embodiment of a blank material for making the side wall.

FIG. 20 shows an example of a blank material 35 for forming the lid 1 shown in FIG. 19, which comprises cuts 41a at positions close to the arc shaped part 33 at the upper end of the blank material 35 for forming tags 42, and cuts 39a at positions close to the arc shaped part 34 at the lower end for forming cuts 39. By folding each of the upper end and the lower end of the blank material 35, a lid 1 is formed comprising cuts 41 and tags 42 at the upper end of the lid and cuts 39 at the lower end part of the folded part 40 at the lower end of the lid.

Cuts may be provided at the upper end edge 11a, 12a of the folded part 11, 12 of the lid 1 shown in FIG. 5 and FIG. 6 to provide tags which can be folded at the upper end edge part of the lid 1. The tags may be provided with representations of the container content. The lid 1 may be provided with a folded part 11 formed by folding the upper end of the upper wall 5 as in the lid shown in FIG. 5 and the lid 1 may be provided with a folded part 12 formed by folding the upper end of the standing part 4 of the cover wall as shown in FIG. 6. In these cases, folding of the tag part becomes easy by arranging the upper end 11a, 12a of the folded part to protrude with respect to the upper end of the standing part 4 of the cover wall or the upper end of the side wall 3 and providing the tags in the protruded part.

Figure 24:
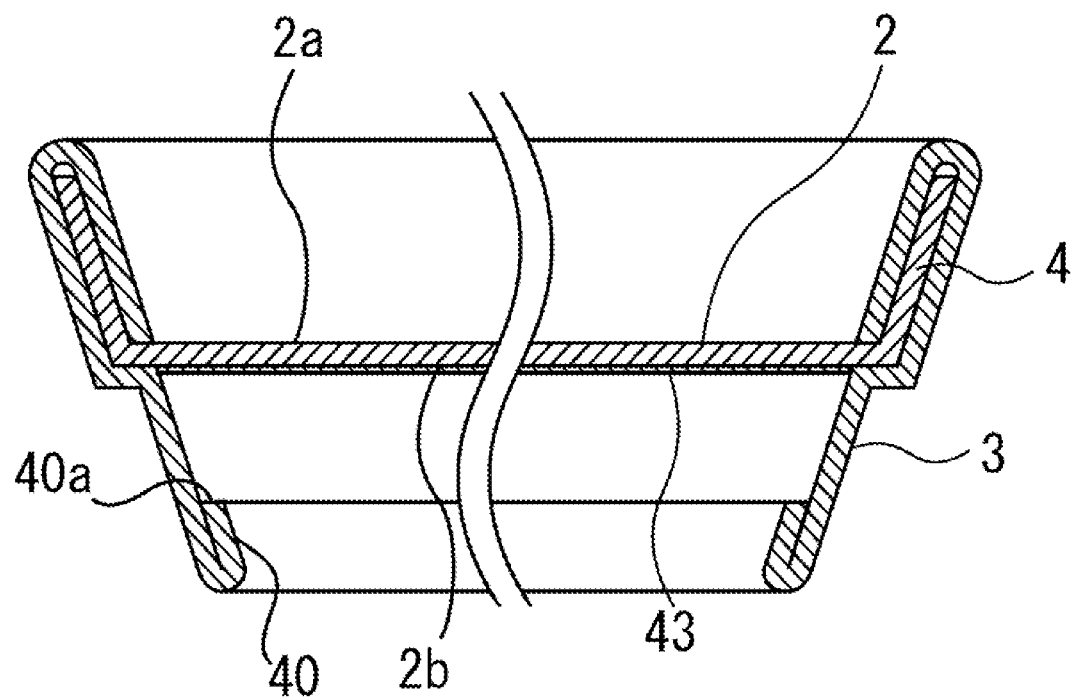
FIG. 24 is a longitudinal sectional view of yet another embodiment of the lid.

In the lid 1 of the present invention, when the back side of the cover wall 2 is provided with a metal foil layer 43 as shown in FIG. 24, water resistance and moisture resistance etc. can be increased and the adhesion between the lid 1 and the opening part of the container 7 when it is closed is increased. As the metal foil layer 43, normally aluminum is preferably used, and it can be provided e.g. by sticking a metal foil such as an aluminum foil or by deposition. Preferably, the metal foil layer 43 is provided at the exposed part of the back surface 2b of the cover wall 2. By the absence of the metal foil layer 43 on the standing part 4 of the cover wall 2, the heat sealability between the standing part 4 and the side wall 3 can be maintained.

Figure 25:
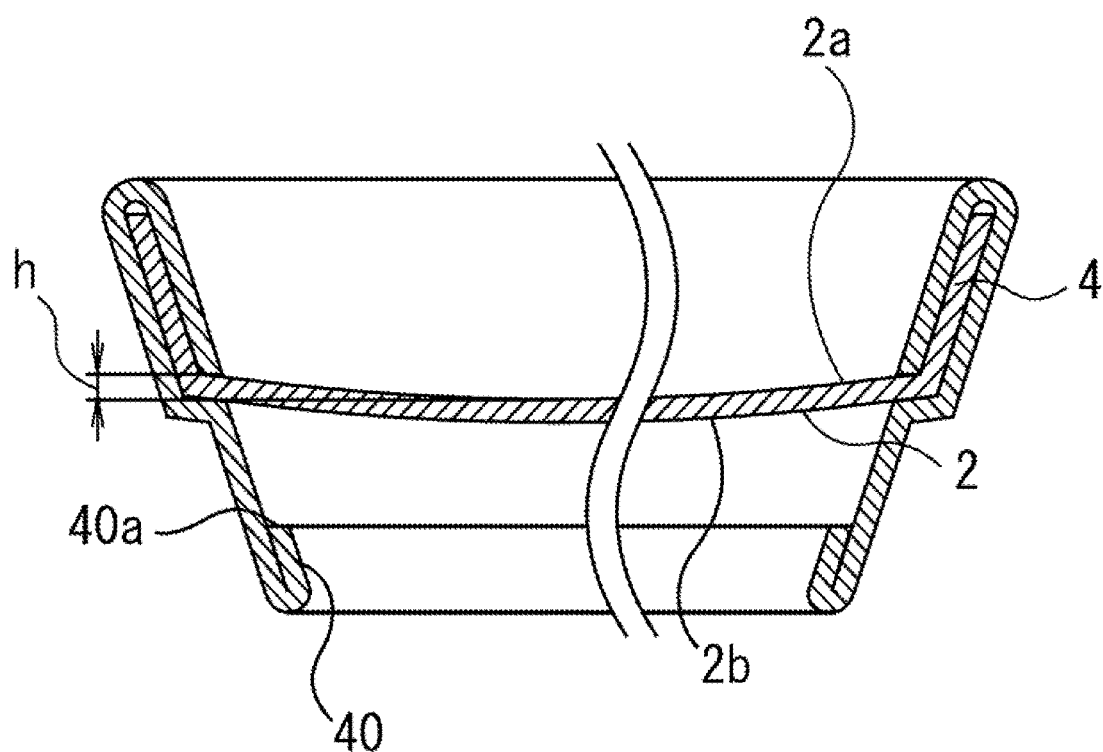
FIG. 25 is a longitudinal sectional view of yet another embodiment of the lid.

In the lid 1 of the present invention, when the top surface 2a (upper surface) formed in the location surrounded by the standing part 4 of the cover wall 2 is curved to be recessed as shown in FIG. 25, the lid 1 can be fitted to and removed from the container 7 while maintaining the sealability when the lid is closed. In case the lid comprises a drinking port for a liquid container, when the top surface 2a is curved to be recessed, the leftover drink easily goes back to inside of the container 7 from the top surface 2a via the drinking port, thus the leftover drink is less likely to remain on the top surface 2a. Preferably, the degree of the recess curve is at least 0.3 mm, more preferably at least 0.5 mm, more preferably at least 0.8 mm, particularly preferably at least 1 mm. The upper limit of the degree of the recess curve depends on the size of the lid 1, but normally at most 6 mm is preferred, more preferably at most 5 mm, more preferably at most 4 mm. The degree of the recess curve means the difference between the highest point and the lowest part of the top surface 2a of the cover wall 2, and as shown in FIG. 25, normally the difference h between the border part between the cover wall 2 and the standing part 4 and the lowest part of the top surface 2a.

Figure 26:
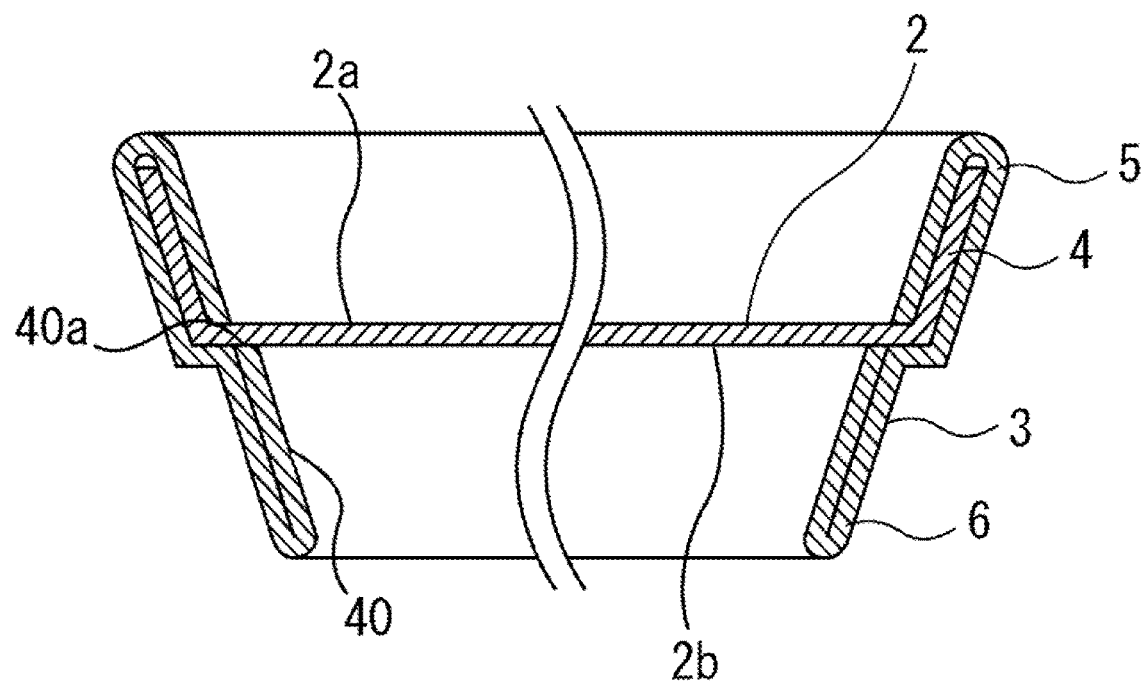
FIG. 26 is a longitudinal sectional view of yet another embodiment of the lid.

FIG. 26 shows yet another embodiment of the lid 1 of the present invention. As shown in FIG. 26, the folded part 40 of the lower wall 6 of the side wall 3 may be folded in such a way that the edge 40a contacts or substantially contacts the back surface 2b of the cover wall 2. The lower wall 6 of the lid 1 shown in FIG. 26 and the lid 1 previously shown in FIG. 19 has a double-walled structure by folding. Since the standing part 4 formed at the circumference of the top surface 2a of the cover wall 2 is joined with the upper wall 5, the lower wall 6 which is the part to engage with the opening part 7 is not rigid like in conventional lids having a structure wherein the side wall and the cover wall overlap. Accordingly, even when the lower wall 6 is formed as a dual-wall structure, the elasticity of the lower wall 6 does not decrease.

The present invention further provides the following embodiments:

1. A lid (1) attachable to an opening part of a container (7) in a removable manner, wherein the lid (1) comprises a cover wall (2) and a side wall (3) including an upper wall (5) and a lower wall (6),
   wherein the upper wall (5) is tapered in a direction from an upper end of the side wall (3) towards a lower end of the side wall (3),
   wherein the side wall (3) is made of a paper material,
   wherein the lid (1) further comprises a standing part (4) extending upwardly from the circumference of the cover wall (2),
   wherein the cover wall (2) and the standing part (4) are surrounded by the upper wall (5), wherein an inner surface of the upper wall (5) is joined with the standing part (4) so that the cover wall (2) and the side wall (3) are integrated with each other, and
   wherein the lower wall (6) comprises an engaging part (9) configured to engage with the opening part of the container (7), wherein the engaging part (9) is provided on an inner circumferential surface of the lower wall (6).
2. The lid (1) according to embodiment 1, wherein the side wall (3) is tube-shaped and is made by joining edges of the upper wall (5) and the lower wall (6) made of the paper material.
3. The lid (1) according to embodiment 1 or 2, wherein the engaging part (9) is configured to engage with a curled portion of the opening part of the container (7).
4. The lid (1) according to any one of the preceding embodiments, wherein the engaging part (9) comprises a ring-shaped recess made by pressing the inner circumferential surface of the lower wall (6).
5. The lid (1) according to any one of the preceding embodiments, wherein the engaging part (9) has an inner diameter that is smaller at a lower end thereof than at an upper end thereof.
6. The lid (1) according to embodiment 5, wherein the lower wall (6) is tapered in the direction from an upper end of the side wall (3) towards a lower end of the side wall (3), and wherein the engaging part (9) is configured to engage with the opening part of the container (7) when the lid (1) is brought in attachment to the opening part of the container (7) and is thereby made to close the opening part of the container (7).
7. The lid (1) according to any one of the preceding embodiments, wherein the cover wall (2) is made of a paper material.
8. The lid (1) according to any one of the preceding embodiments, wherein the cover wall (2) is made of a film or a sheet of material.
9. The lid (1) according to any one of the preceding embodiments, wherein the cover wall (2) comprises a recessed part (31) at a position inward from the standing part (4).
10. The lid (1) according to any one of the preceding embodiments, provided with a curled part at an upper end thereof.
11. The lid (1) according to embodiment 10, wherein the curled part is formed by bending an upper end part of the upper wall (5).
12. The lid (1) according to embodiment 10 or 11, wherein an upper end part of the upper wall (5) is folded towards the inner side of the standing part (4).
13. The lid (1) according to embodiment 10, wherein the curled part is formed by bending an upper end part of the standing part (4).
14. The lid (1) according to embodiment 10 or 13, wherein an upper end part of the standing part (4) is folded towards the inner side of the standing part (4).
15. The lid (1) according to embodiment 10 or 13, wherein an upper end part of the standing part (4) is folded towards the outer side of the upper wall (5).
16. The lid (1) according to any one of the preceding embodiments, wherein the side wall is made by joining edges of an annular sector shaped blank material.
17. A kit of parts comprising the lid (1) according to any one of the preceding embodiments and a container (7) having an opening part to which the lid (1) is attachable in a removable manner.
18. The kit of parts according to embodiment 17, wherein the side wall (3) of the lid (1) is tapered at a smaller angle than a side wall (7a) of the container (7).
19. An assembly of the lid (1) according to any one of embodiments 1-16 and a container (7) having an opening part to which the lid (1) is attached in a removable manner.
20. The assembly according to embodiment 19, wherein a lower end of the engaging part (9) of the lid (1) is in a non-contact state with a side wall (7a) of the container (7).

In the above description, the explanation was given for a circular lid 1. However, the lid 1 may also have shapes such as oval, rectangular, triangular, polygon, chamfered rectangular or chamfered polygon. The above explained examples may be independently applied or suitably combined.

REFERENCE SIGNS LIST 1 lid
2 cover wall
2a top surface
2b back surface
3 side wall 4 standing part of cover wall
5 upper wall of side wall
6 lower wall of side wall
7 container
8 curled part of container
9 engaging part
10 protruded wall
11 folded part
11a end part of folded part
12a end part of folded part
12 folded part
13 die
14 die
15 die for making engaging part
16 rounded part
20 piece part
21 curled part of lid
22 cut
23 lid piece
24 drinking port
25 holding piece
25a joining part
25b folding part
25c protrusion piece
25d cut
26 holding hole
27 window part
28 recessed part
29 lower contact points
30 lower end part of lower wall
31 surrounding ridge
32 recess
33 arc shaped part at the upper end side of blank material
34 arc shaped part at the lower end side of blank material
35 blank material
36 side end part of blank material
37 side end part of blank material
38 step
39 cuts
39a cuts
40 folded part
41 cuts
41a cuts
42 tags
43 metal foil layer

The invention claimed is:

1. A lid for attaching to an opening part of a container in a removable manner, comprising
a cover wall and a side wall which surrounds a circumference of the cover wall,
wherein the side wall is tapered from an upper end towards a lower end and is made of a paper material,
wherein the lower end is configured to be attached to the container,
wherein the cover wall and the side wall are integrated with each other by a standing part formed on the circumference of the cover wall being joined to an inner surface of an upper wall of the side wall,
wherein an engaging part for engaging with the opening part of the container is provided on an inner circumferential side of a lower wall of the side wall, and
wherein the standing part extends upward at the circumference of the cover wall and upward from the engaging part.

2. The lid according to claim 1, wherein the side wall is a tube made by joining edges of the paper material.

3. The lid according to claim 1, wherein the engaging part of the lower wall of the side wall has a shape which engages with a curled portion the opening part of the container.

4. The lid according to claim 1, wherein the engaging part of the lower wall of the side wall comprises a ring-shaped recess made by pressing the inner circumference surface of the lower wall.

5. The lid according to claim 1, wherein the engaging part has an inner diameter that is smaller at a lower end thereof than at an upper end thereof.

6. The lid according to claim 1, wherein when the lid is attached to the opening part of the container, the lid is attached so that a lower end of the engaging part is in a non-contact state with a side wall of the container.

7. The lid according to claim 1, wherein the side wall is tapered at a smaller tilt angle than a tilt angle of a side wall of the container to which the lid is to be attached.

8. The lid according to claim 1, wherein the cover wall is made of a paper material.

9. The lid according to claim 1, wherein the cover wall is made of a film or a sheet.

10. The lid according to claim 1, wherein the cover wall comprises a recessed part recessed in the direction from the standing part towards the inner side.

11. The lid according to claim 1, wherein an upper end part of the upper wall of the side wall is folded towards the inner surface of the standing part at the circumference of the cover wall.

12. The lid according to claim 1, wherein an upper end of the standing part of the cover wall is folded towards the inner surface of the standing part.

13. The lid according to claim 1, wherein an upper end of the standing part of the cover wall is folded towards the outer side of the upper wall of the side wall.

14. The lid according to claim 1, provided with a curled part at an upper end thereof.

15. The lid according to claim 14, wherein the curled part is formed by bending an upper end part of the upper wall of the side wall.

16. The lid according to claim 14, wherein the curled part is formed by bending an upper end part of the standing part of the cover wall.

17. The lid according to claim 1, wherein the side wall is made by joining edges of an annular sector shaped blank material such that it is tapered from the upper end towards the lower end.

18. The lid according to claim 1, wherein the cover wall comprises a top surface and the top surface is curved to be recessed.

19. The lid according to claim 17, wherein the cover wall comprises a top surface and the top surface is curved to be recessed.

* * * * *